(12) United States Patent
Bryce et al.

(10) Patent No.: US 12,252,207 B2
(45) Date of Patent: Mar. 18, 2025

(54) BICYCLE RACK AND PANNIER SYSTEM

(71) Applicant: Robert Axle Project LLC, Bend, OR (US)

(72) Inventors: Kathryn R. Bryce, Bend, OR (US); Christon C. Kratsch, Bend, OR (US); John Mylne, IV, Bend, OR (US)

(73) Assignee: Robert Axle Project LLC, Bend, OR (US)

( * ) Notice: Subject to any disclaimer, the term of this patent is extended or adjusted under 35 U.S.C. 154(b) by 0 days.

(21) Appl. No.: 18/924,168

(22) Filed: Oct. 23, 2024

(65) Prior Publication Data

US 2025/0042492 A1 Feb. 6, 2025

Related U.S. Application Data

(62) Division of application No. 18/628,108, filed on Apr. 5, 2024, now Pat. No. 12,151,766.

(60) Provisional application No. 63/507,865, filed on Jun. 13, 2023.

(51) Int. Cl.
*B62J 9/21* (2020.01)
*B62J 9/27* (2020.01)

(52) U.S. Cl.
CPC .. *B62J 9/21* (2020.02); *B62J 9/27* (2020.02)

(58) Field of Classification Search
CPC ......... B62J 9/27; B62J 9/23; B62J 9/24; B62J 9/26; B62J 7/08; F16B 21/02; B60P 7/0807

See application file for complete search history.

(56) References Cited

U.S. PATENT DOCUMENTS

| | | | |
|---|---|---|---|
| 4,450,988 A | 5/1984 | Meisel | |
| 4,671,438 A * | 6/1987 | La Plante | B62J 9/27 |
| | | | 224/438 |
| 5,604,958 A | 2/1997 | Anscher | |
| 6,401,998 B1 | 6/2002 | Puluso | |
| 10,829,175 B2 * | 11/2020 | Budd | B62J 9/26 |
| 11,364,852 B2 * | 6/2022 | Robillard | B62J 9/27 |
| 12,065,210 B2 * | 8/2024 | Silsby | B62J 9/24 |
| 2023/0159122 A1 | 5/2023 | Silsby et al. | |

* cited by examiner

*Primary Examiner* — Corey N Skurdal
(74) *Attorney, Agent, or Firm* — Leber IP Law; Celia H. Leber

(57) ABSTRACT

The disclosure features a bicycle rack and pannier system, a bicycle rack, and a bicycle accessory that can be used to mount the bicycle rack to a bicycle. The system comprises (a) a pannier comprising a bag having a back wall and a locking mechanism extending from the back wall, and (b) a rack configured to be mounted generally vertically on a portion of a bicycle, the rack including a rack body having a keyed opening configured to receive a portion of the locking mechanism. The locking mechanism is mounted on the bag to be pivotable between an open position, in which the portion of the locking mechanism can be inserted into or removed from the keyed opening, and at least one locked position, in which the portion abuts a surface of the rack body preventing removal of the portion of the locking mechanism.

14 Claims, 34 Drawing Sheets

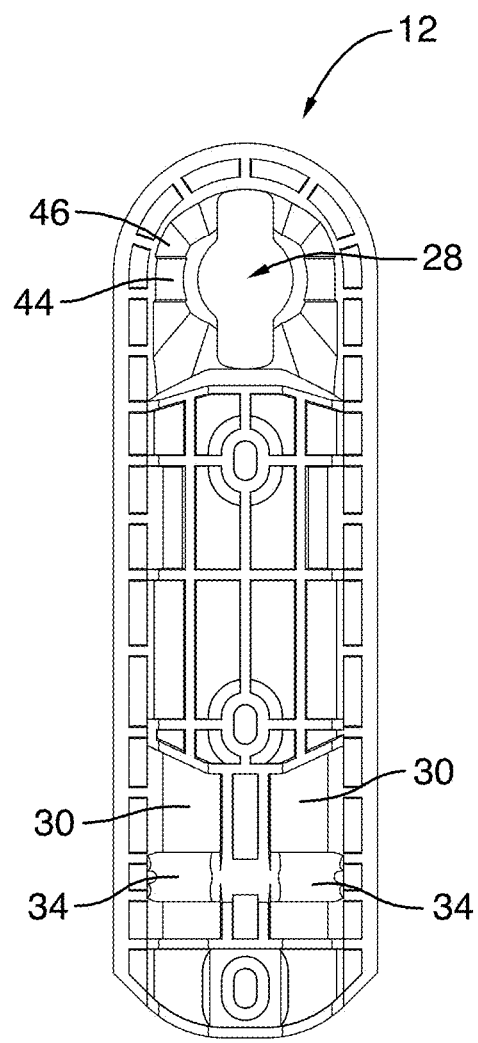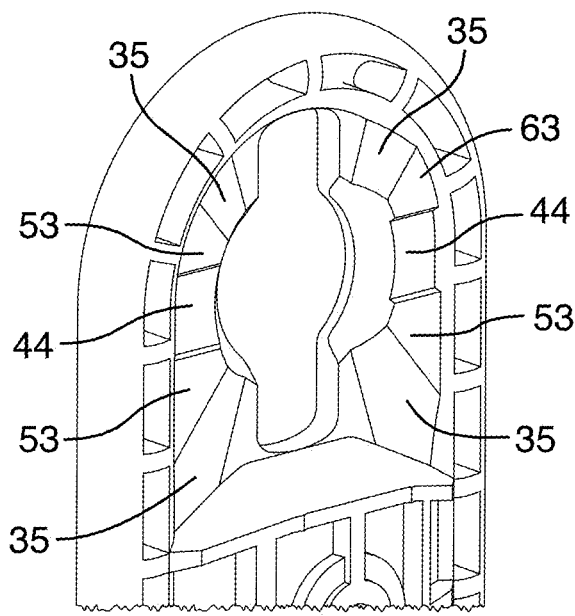
FIG.10D
FIG.10E

BICYCLE RACK AND PANNIER SYSTEM

RELATED APPLICATIONS

This application is a divisional application of U.S. patent application Ser. No. 18/628,108, filed Apr. 5, 2024, which claims priority from U.S. Patent Application No. 63/507,865, filed Jun. 13, 2023, the entire disclosures of which are incorporated herein by reference.

BACKGROUND

Many types of panniers and racks have long been used by bicyclists to carry cargo on their bicycles, both for bicycle touring and for shorter trips such as running errands or commuting by bicycle.

Traditionally, pannier racks were designed for use with road bicycles having threaded eyelets configured for rack mounting, for example two per side, one lower and one upper, or one lower per side and a single centered upper location. Many of these pannier racks were designed to extend rearwardly from the bike, over the rear wheel, while others were designed to be mounted over the front wheel to provide the option to carry both front and rear panniers.

Other options have been explored to accommodate the advent of mountain bikes and other types of bikes without eyelets and/or with suspension forks or frame geometries or materials that do not lend themselves well to carrying panniers. One notable option has been to cantilever a rear pannier rack out from the bicycle's seatpost.

As bicycles continue to evolve, including the increasing popularity of e-bikes and full suspension mountain bikes, new options for carrying paniers continue to be sought.

SUMMARY

The present disclosure features a panier rack and panier configured to be mounted on a bicycle, for example on the front fork or other appropriate mounts on the bicycle. The panier is configured to be easily and quickly mounted on and removed from the rack, and to be securely locked in place when mounted.

In one aspect, the present disclosure features a bicycle rack and pannier system. The system comprises (a) a pannier comprising a bag having a back wall and a locking mechanism extending from the back wall, and (b) a rack configured to be mounted generally vertically on a portion of a bicycle, the rack including a rack body having a keyed opening configured to receive a portion of the locking mechanism. The locking mechanism is mounted on the bag to be pivotable between an open position, in which the portion of the locking mechanism can be inserted into or removed from the keyed opening, and at least one locked position, in which the portion abuts a surface of the rack body preventing removal of the portion of the locking mechanism.

Some implementations of the system may include one or more of the following features.

The locking mechanism may include a base plate, a shaft extending from the base plate and defining a central bore, and a pair of wings extending radially from the central bore. In such implementations the keyed opening may be shaped to correspond to the profile of the shaft and wings.

The pannier may further include one or more hooks extending from the back wall, and the rack further include one or more openings configured to receive the one or more hooks.

The rack body may be configured to be mounted on the fork of the bicycle or on other appropriate mounts on the bicycle. For example, the rack body may include apertures positioned to correspond to the spacing of bottle cage mounts on the fork.

A sleeve may be positioned in the central bore of the locking mechanism and the sleeve secured to the back wall of the bag, such that the sleeve is stationary and the locking mechanism rotates relative to the sleeve.

A rear-facing surface of the rack body may include a seat configured to receive the wings when the locking mechanism is pivoted into (one of) the locked position(s).

The locking mechanism may be configured to be pivoted into two discrete locked positions, e.g., disposed at 180 degrees to each other.

The system may further include an accessory configured to be mounted adjacent the fork, the accessory having mounting points configured to receive fasteners inserted through apertures in the rack body.

The accessory may include an elongated body configured to be mounted to the fork by cable ties, the elongated body including threaded apertures positioned to correspond to the spacing of the apertures in the rack body.

The accessory may further include an aperture configured to allow a lower end of the accessory to be mounted on an end of a thru axle.

In preferred implementations the locking mechanism does not include a spring mechanism.

In another aspect, the disclosure features a bicycle rack configured to be mounted on a fork of a bicycle. The rack includes (a) a generally oblong frame; and (b) a central rack body disposed within the frame, the rack body including a plurality of apertures configured to receive fasteners for attaching the rack to the fork, and an upper keyed opening for receiving a portion of a locking mechanism of a pannier.

Some implementations of the rack may include one or more of the following features.

The rack body may further include a pair of lower openings configured to receive hooks of the pannier.

The rack body may include a longitudinally extending central region that is generally planar, the apertures being positioned in this central region, and outer regions that extend from the central region at an angle thereto or curved away from the central region such that the outer regions are spaced from the fork when the rack is mounted on the fork.

The keyed opening may include a central portion with arcuate sides, and upper and lower portions having generally straight, parallel sides.

In yet a further aspect, the present disclosure features a bicycle accessory that includes an elongated body configured to be mounted on a portion of a bicycle frame, the elongated body having a longitudinal axis, a lower end and an upper end. The body includes (a) a plurality of threaded apertures, spaced along the longitudinal axis, the threaded apertures being configured to receive fasteners in threaded engagement, (b) an axle-receiving aperture at the lower end of the body, configured to be positioned over an end of a thru axle, and (c) an attachment aperture at the upper end of the body, configured to allow the upper end of the body to be secured to the fork.

Some implementations of the bicycle accessory may include one or more of the following features.

The axle-receiving aperture may be offset from the longitudinal axis of the body, allowing the longitudinal axis of the body to be offset from that of the fork.

In another aspect, the disclosure features a method of mounting a pannier on a fork of a bicycle. The method includes (a) providing a bicycle rack and pannier system as described above, (b) inserting the portion of the locking mechanism through the keyed opening with the portion aligned with the keyed opening; and (c) rotating the portion of the locking mechanism to a locked position in which the portion is out of alignment with the keyed opening.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

DETAILED DESCRIPTION

Figure 1:
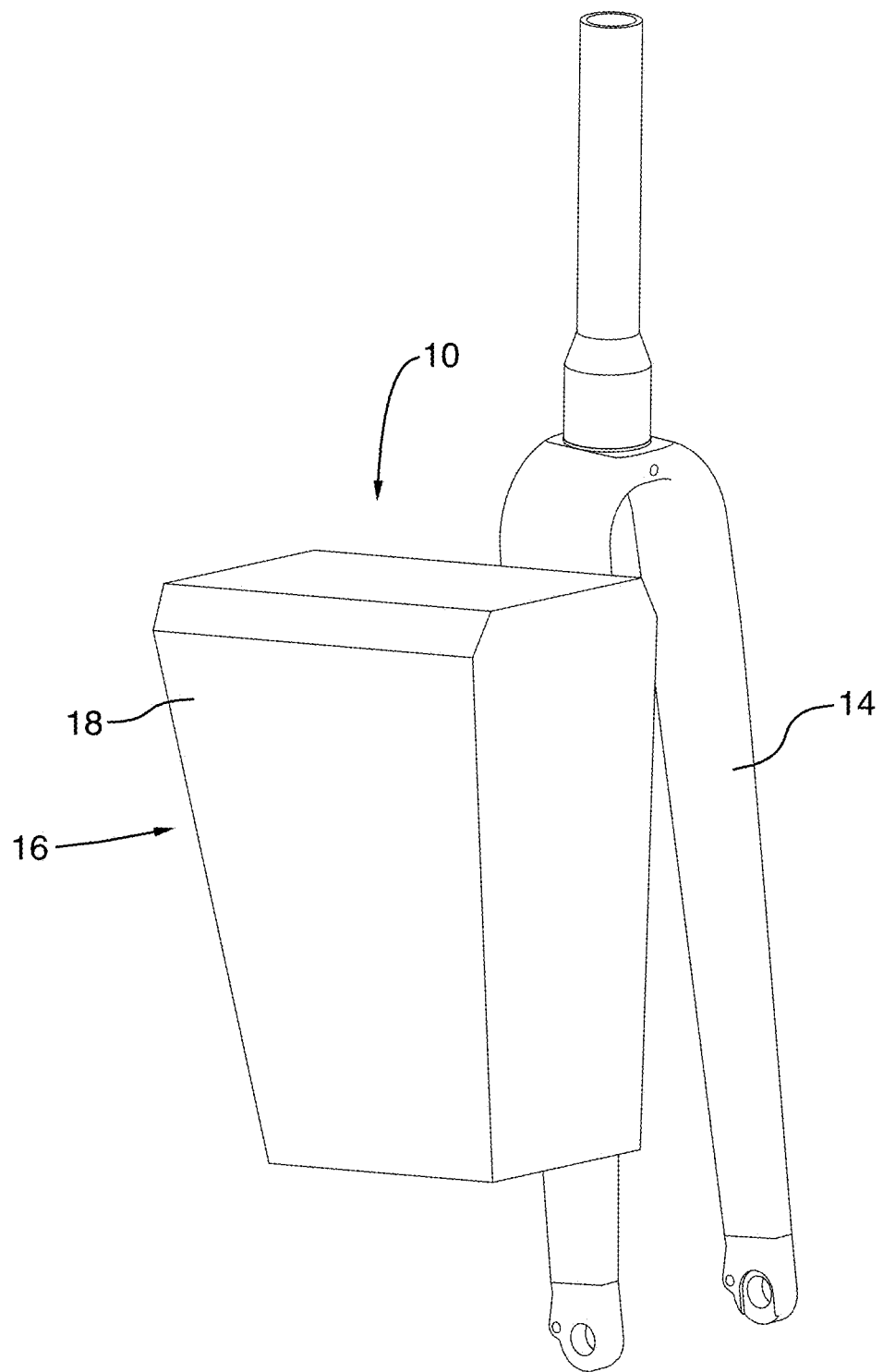
FIG. 1 is a perspective view of a bicycle rack and pannier system according to one implementation, mounted on the front fork of a bicycle. The system can also include a second rack and pannier mounted on the opposite side of the fork, however only one is shown in FIG. 1 for clarity.
Figure 1A:
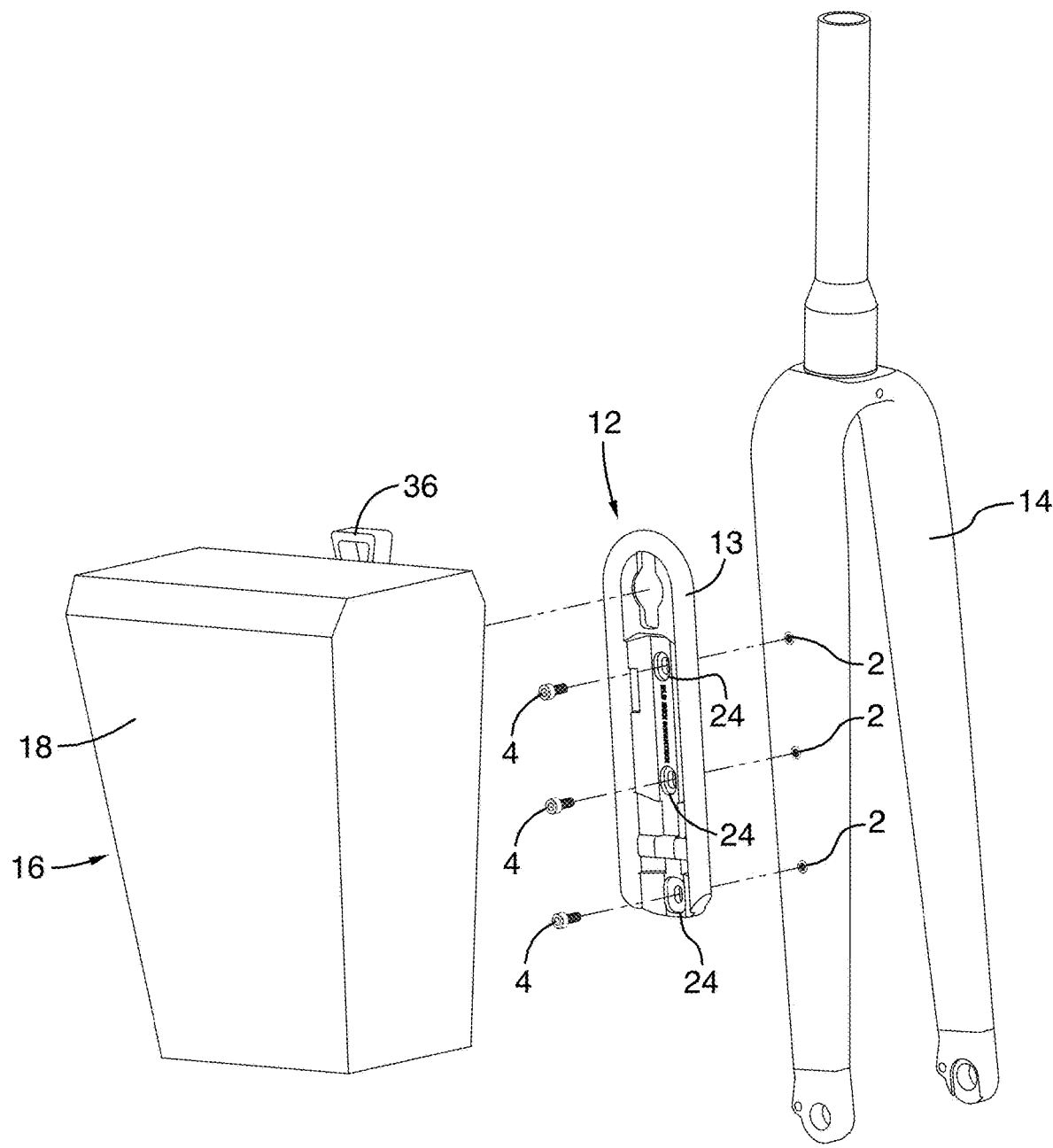
FIG. 1A is an exploded perspective view of the system and fork of FIG. 1 shown from one angle (showing the front of the rack).
Figure 1B:
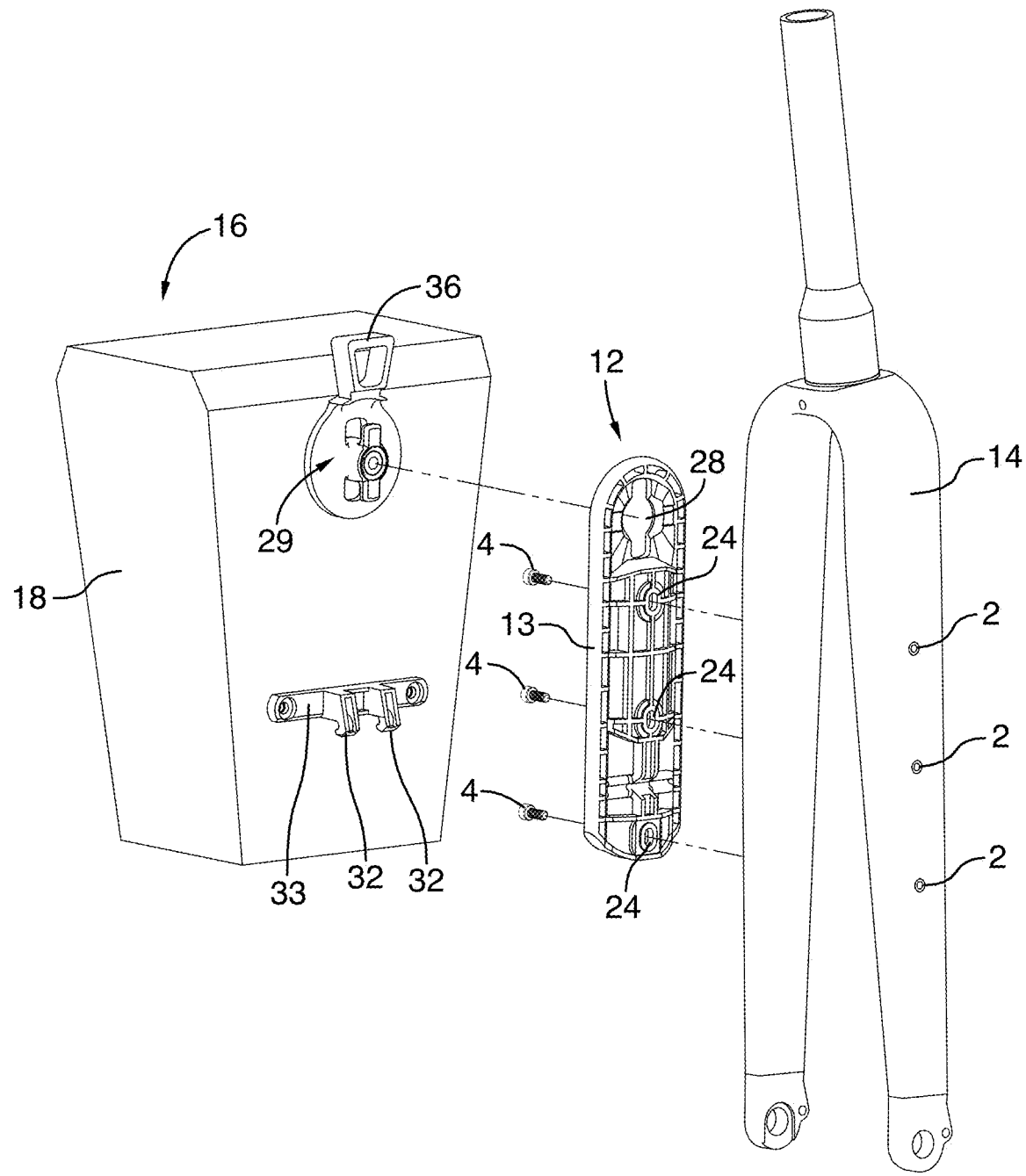
FIG. 1B is an exploded perspective view of the system and fork shown from a different angle (showing the back of the rack).

Referring to FIGS. 1-1B, a bicycle rack and pannier system 10 includes a bicycle rack 12 (FIGS. 1A and 1B), mounted on the front fork 14 of a bicycle as will be discussed in detail below. A pannier 16 is mounted on the rack 12. The pannier 16 includes bag 18, which may be of fabric or any other desired material, for example a rigid material such as hard plastic, and hardware (FIG. 1B) configured to removably attach the pannier to the rack 12. This attachment hardware will be discussed in detail below.

Figure 2:
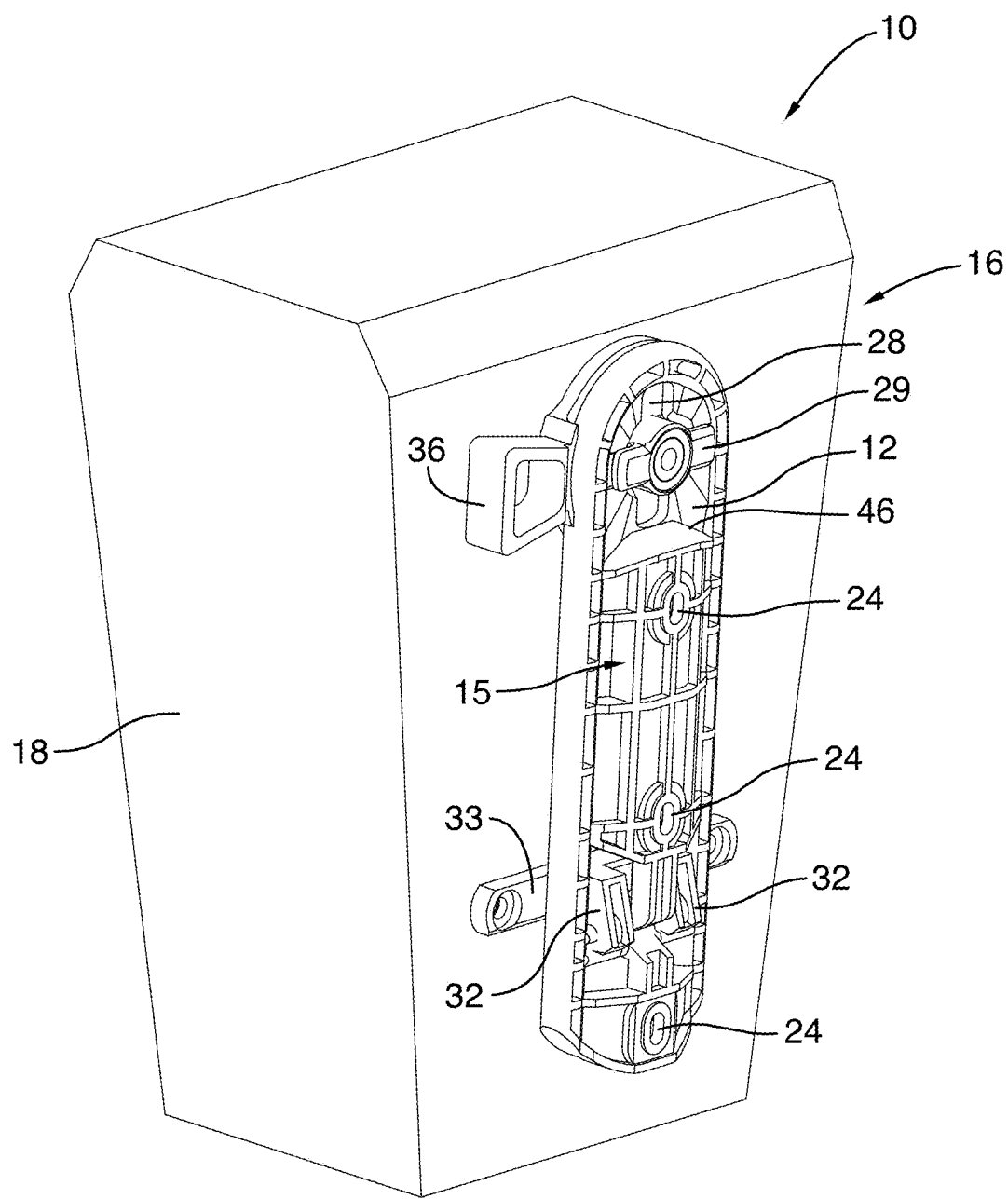
FIG. 2 is a perspective view of the bicycle rack and pannier system, with the fork omitted for clarity. The rack would not be mounted on the pannier in this manner in use; this view is included to allow the back of the rack to be visible with the pannier mounted on the rack.

In the implementation shown in FIGS. 1A and 1B, the rack 12 is mounted on the fork 14 via bottle cage mounts 2, which are included on many commercially available "utility forks," using fasteners 4 which are inserted through three through holes 24 in the rack 12. These holes 24 are spaced to correspond to the standard spacing of bottle cage mounts, typically about 64 mm apart. An alternative manner of attachment, that does not require the use of bottle cage mounts, will be discussed later in this document with reference to FIGS. 11-17. Such forks are designed for bicycles intended for gravel road riding, bikepacking, endurance mountain biking, and other activities where the cyclist wishes to make use of as much available carrying space on the bike as possible, often including the "triangle" where water bottle cages are often mounted. The rack 12 includes a generally oblong frame 13 shaped to extend along the length of the fork and only protrude a short distance laterally beyond the fork. The frame 13 encloses a central rack body 15, which has a curvature, best seen in FIG. 2, that flares the sides of the rack body 15 away from the fork, providing clearance between the rack 12 and the fork 14 except for the small area along the length of the rack where the rack is mounted to the fork. The back (fork-facing) surface of the central rack body 15 also includes an upper body portion 46, best seen in FIG. 10A, the function of which will be discussed below, which is recessed relative to the plane of the rest of the central rack body along the length of the frame.

Figure 2A:
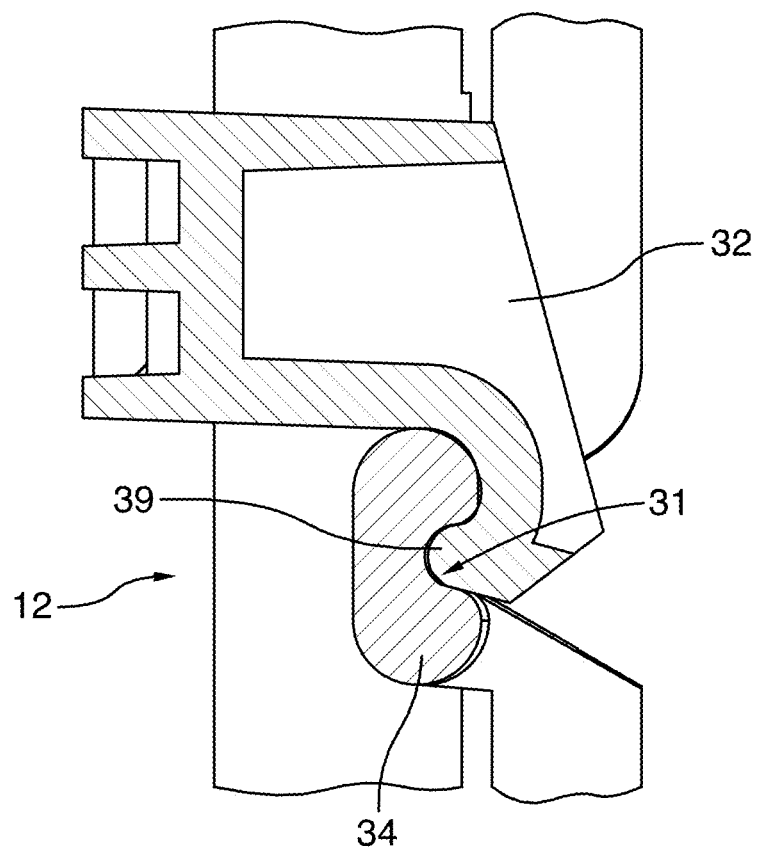
FIG. 2A is an enlarged detail cross-sectional view showing the engagement of one of the hooks 32 on the pannier with the crossbar 34 of the rack.
Figure 4:
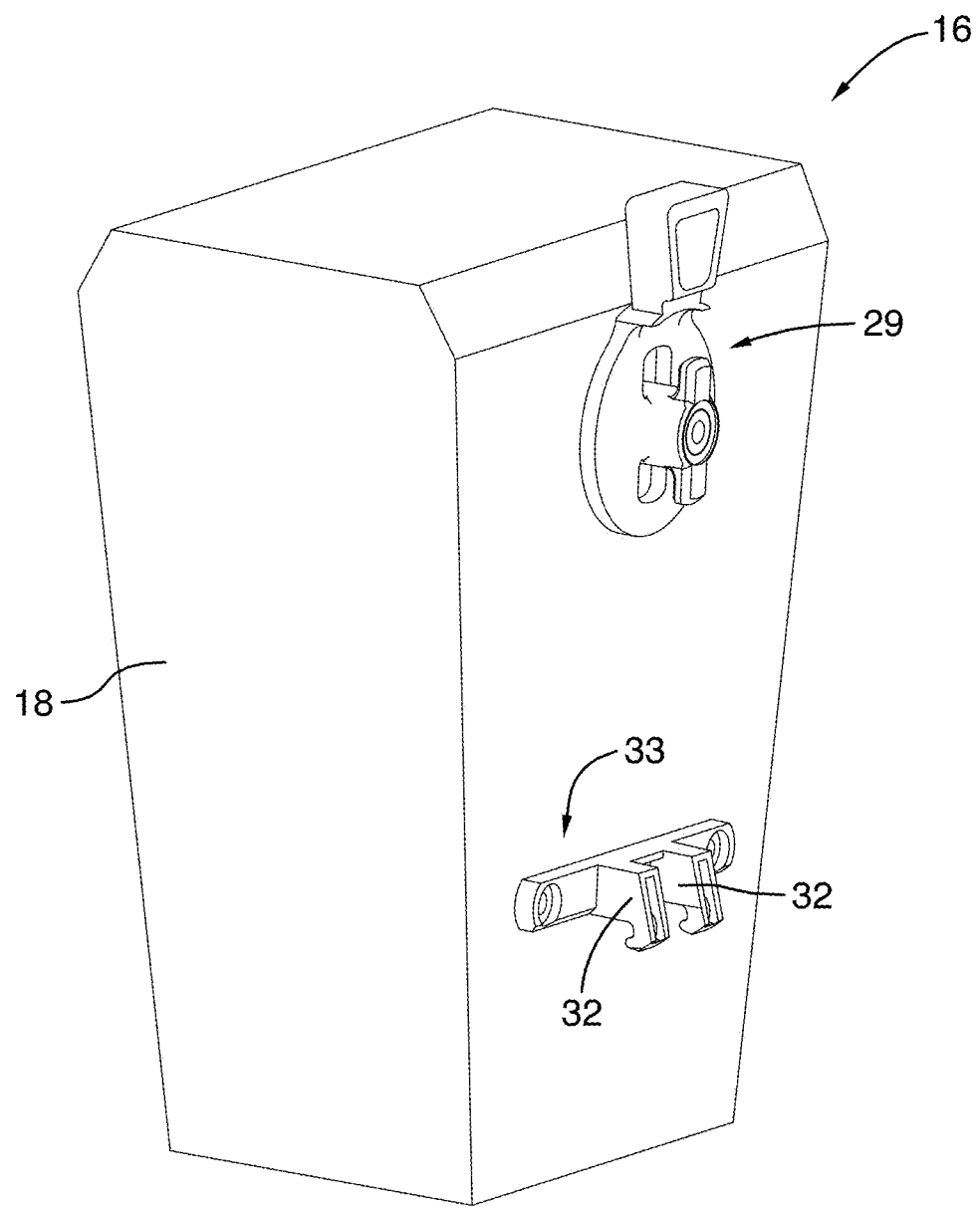
FIG. 4 is a perspective view of the pannier used in the system shown in FIG. 1.
Figure 5:
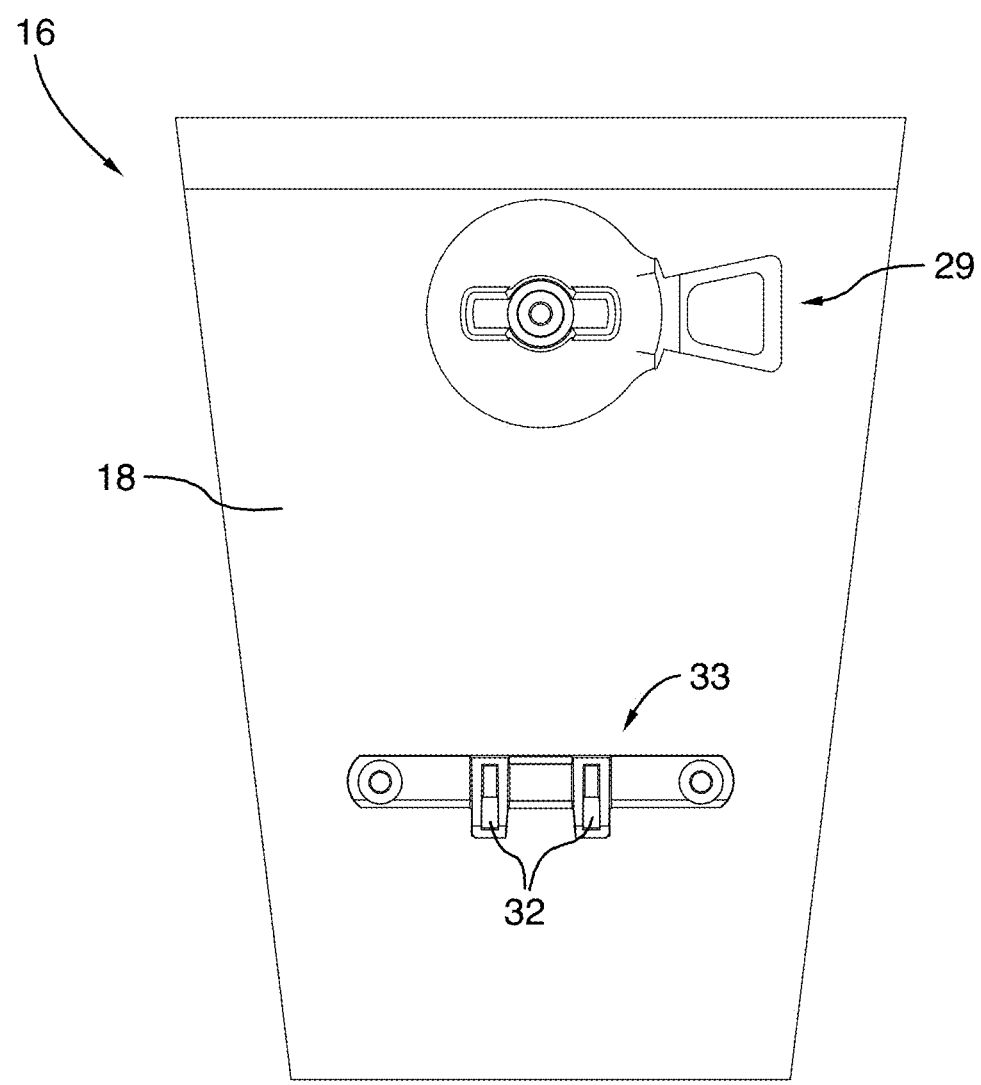
FIG. 5 is a rear plan view of the pannier showing the locking mechanism in a position corresponding to that shown in FIG. 3A.
Figure 5A:
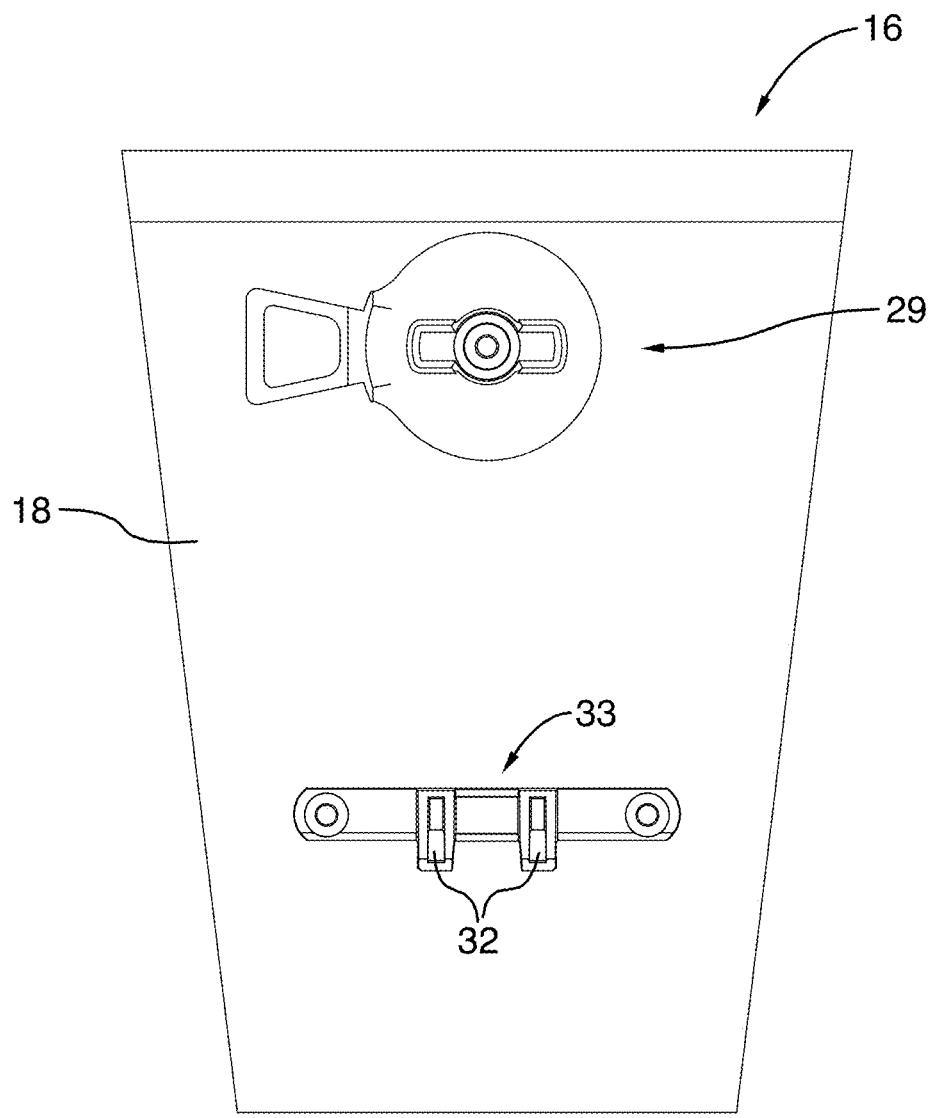
FIG. 5A is a rear plan view showing the locking mechanism in a position corresponding to that shown in FIG. 3B.
Figure 10:
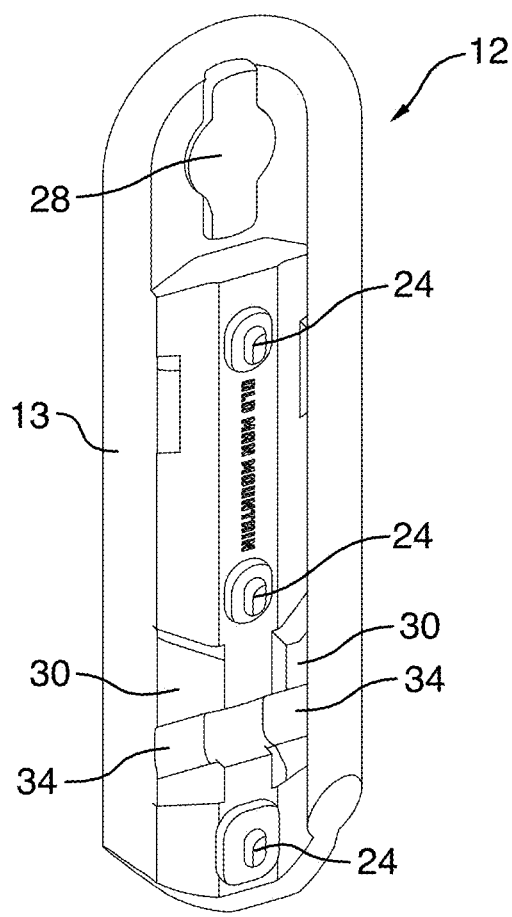
FIGS. 10-10D are, respectively, front perspective, rear perspective, front, side, and rear views of the rack.
Figure 10A:
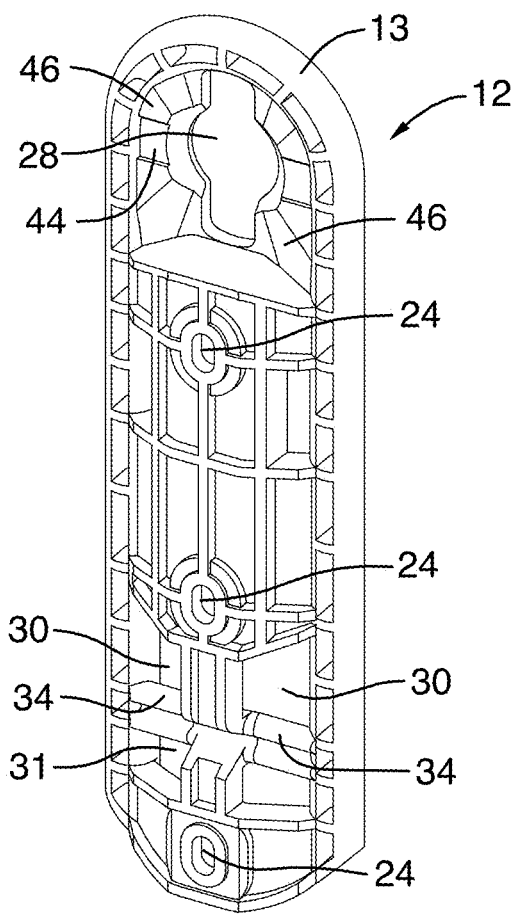
FIG. 10E is an enlarged perspective view of the upper portion of the rack as shown in FIG. 10D.
Figure 10B:
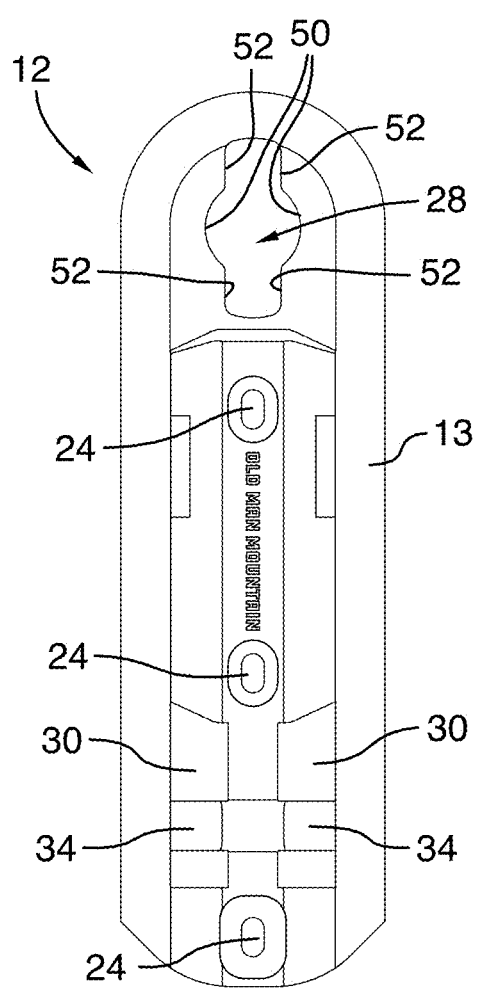
Figure 10C:
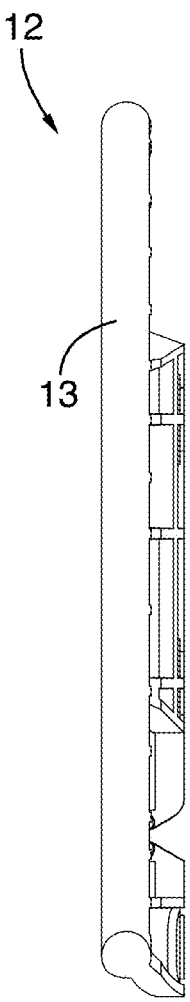
Figure 18:
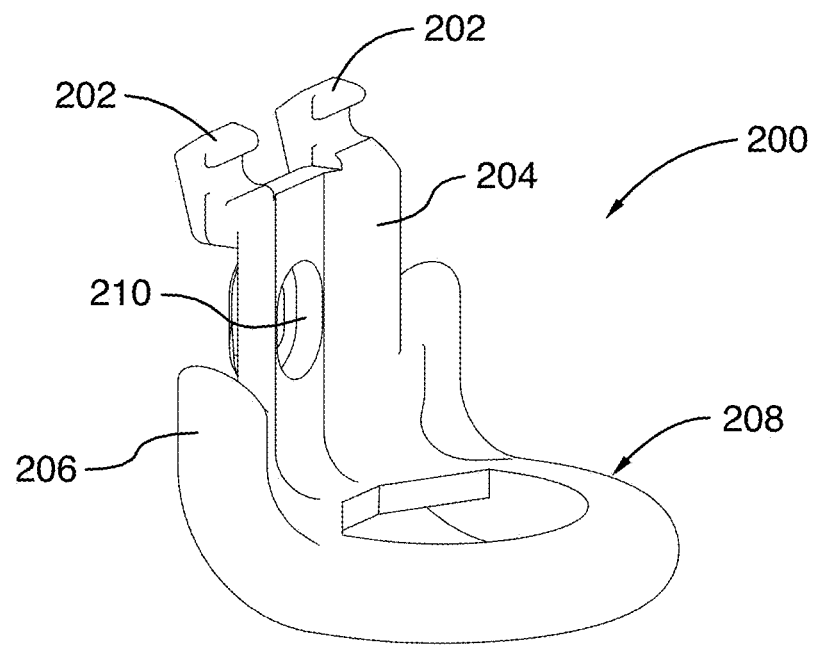
FIGS. 18 and 18A are, respectively, front and rear perspective views of a foot that can be attached to the rack.

Referring to FIGS. 10 and 10A, in which the rack 12 is shown in isolation, the rack 12 also includes a central keyed opening 28 configured to receive a locking mechanism 29 (FIG. 4) on the pannier 16, and a pair of generally rectangular openings 30 (FIGS. 10B and 10D) configured to receive hooks 32 (FIG. 4) extending from a hook plate 33 mounted on the pannier 16. The rectangular openings 30 may also be used to receive hooks 32 (FIG. 4) on the pannier 16 or similar hooks on other accessories, as will be discussed below with reference to the example shown in FIGS. 18-20. Hooks 32 wrap around crossbar 34 on the rack 12, into an engaged position shown in FIG. 2A. As can be seen in FIG. 2A, the crossbar 34 includes a horizontally extending groove 31 (FIG. 10A) that is dimensioned to receive the tips 39 of the hooks 32, holding the hooks securely in place.

The engagement of hooks 32 with crossbar 34 acts in conjunction with the latching engagement provided by the locking mechanism 29 and keyed opening 28 to provide a secure attachment of the pannier 16 to the rack. Without the lower attachment provided by the hooks and crossbar the pannier 16 would tend to pivot about the locking mechanism 29 during use.

Figure 7:
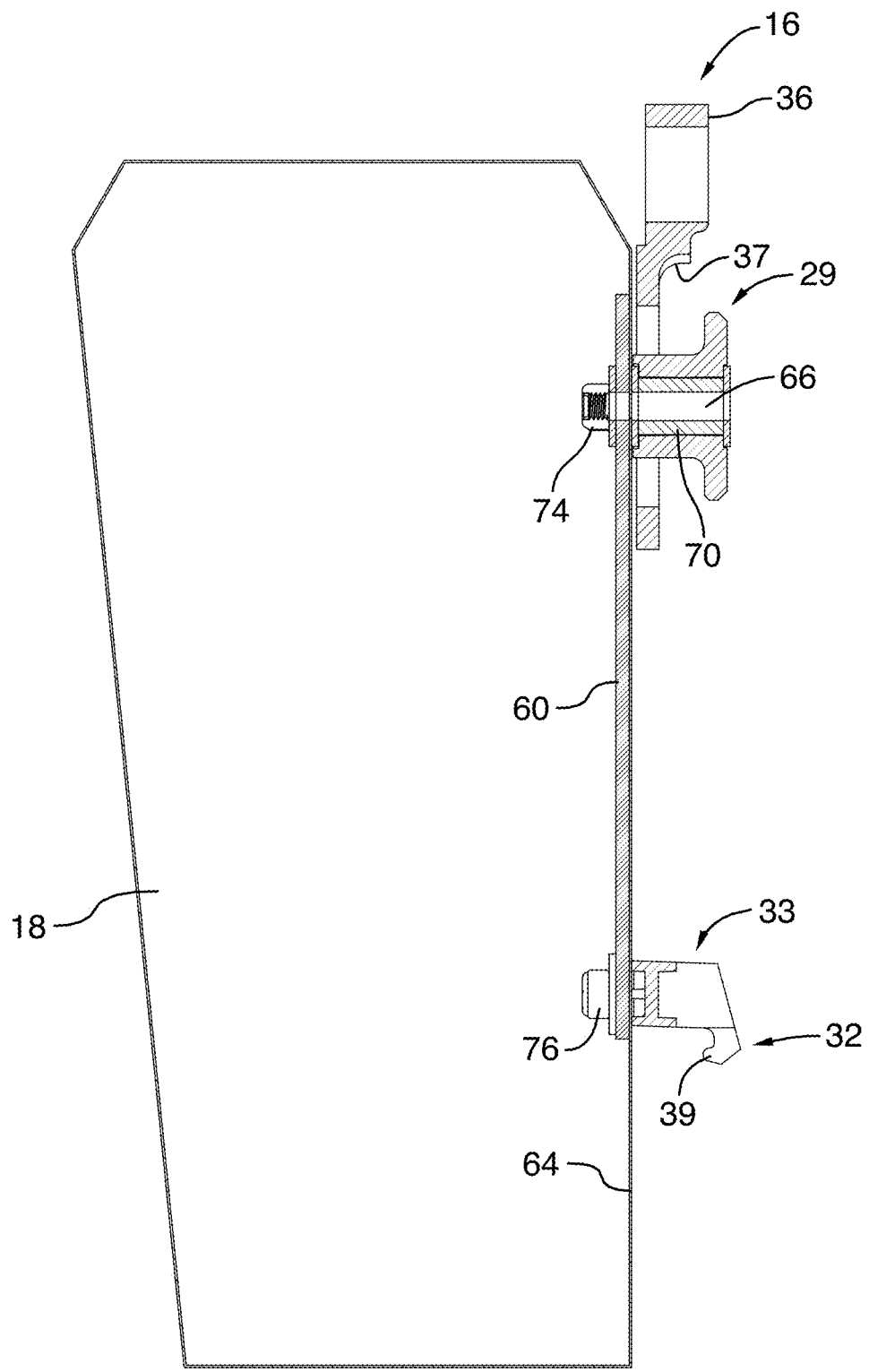
FIG. 7 is a cross-sectional side view of the pannier shown in FIG. 4.

The pannier is held securely in place on the rack by the engagement of locking mechanism 29 in keyed opening 28. The locking mechanism 29 is pivotably mounted, as will be discussed below, on the bag 18. This pivotable mounting allows a user to pivot the locking mechanism in the keyed opening 28 between the three positions shown in FIGS. 3-3B. Pivoting is facilitated by handle 36, which extends outwardly from the body of the locking mechanism 29. As best seen in FIG. 7, the handle 36 includes an arcuate surface 37 configured to abut and slide along the outer surface of the rack frame 13.

Advantageously, the locking mechanism does not utilize a spring mechanism, unlike many existing panniers that have spring-loaded mechanisms for attaching the pannier to a rack. The use of the locking mechanism 29, which is manually rotated by the user, provides secure attachment while minimizing the likelihood of failure due to use under harsh conditions or malfunction due to clogging with mud or debris.

Figure 3:
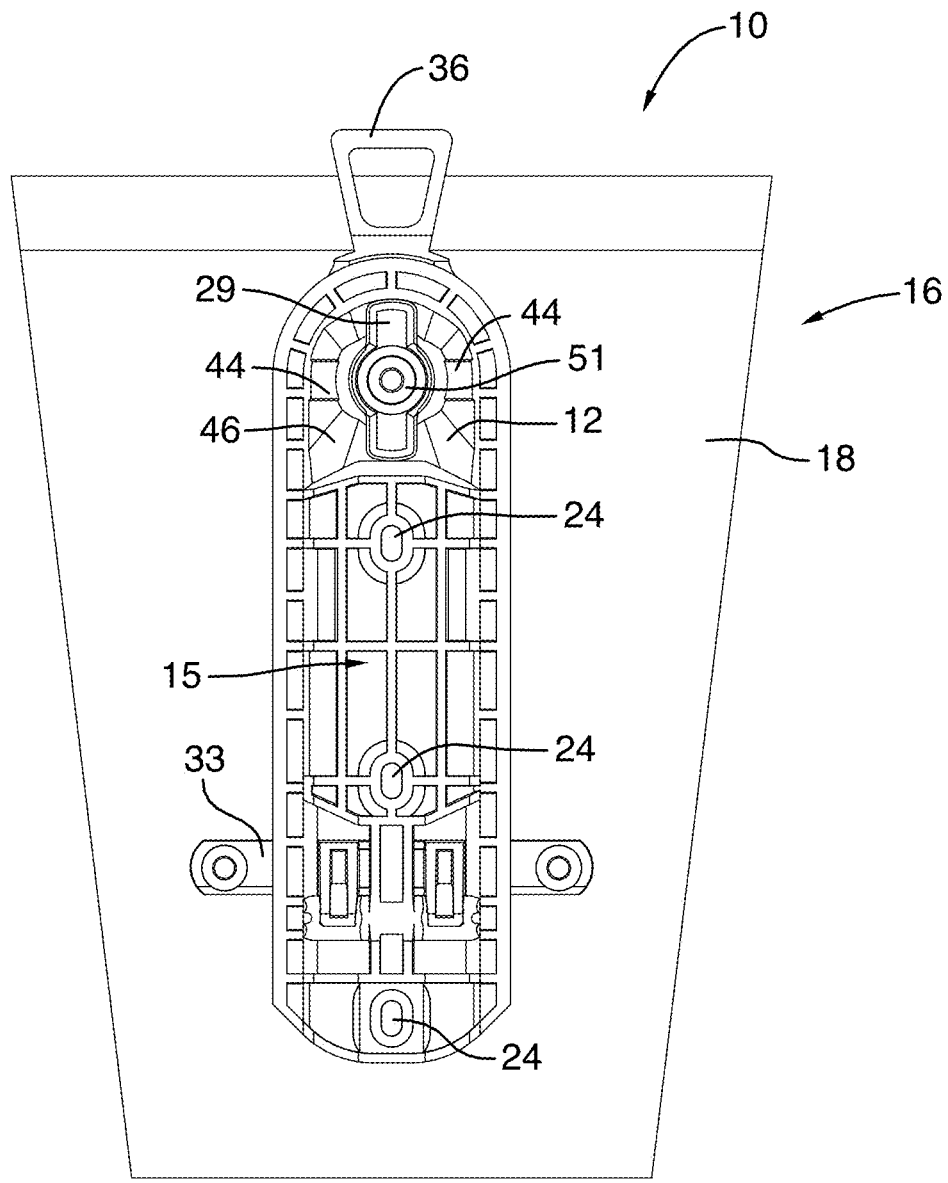
FIGS. 3-3B are rear plan views showing the hardware of the pannier in three positions relative to the rack: unlocked (FIG. 3), locked to the right (FIG. 3A), and locked to the left (FIG. 3B).
Figure 8:
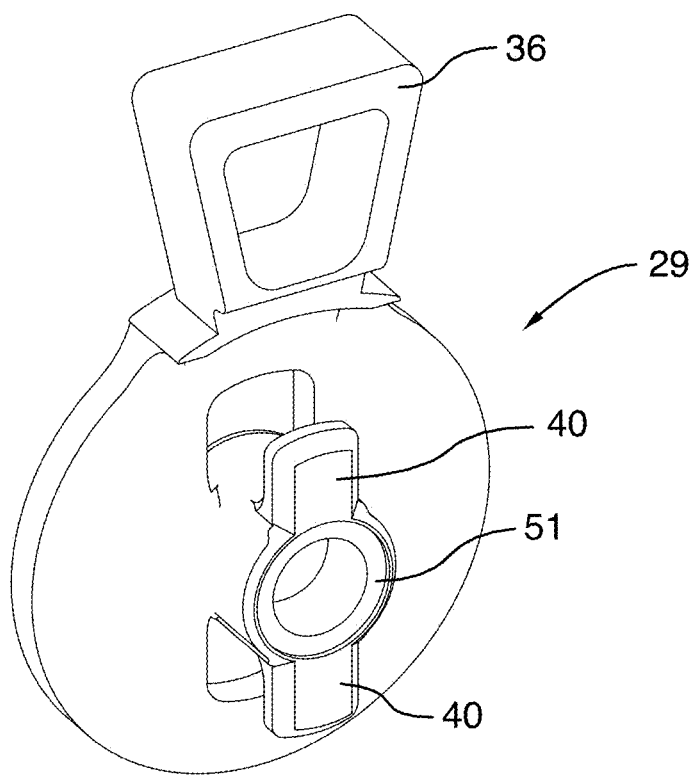
FIGS. 8-8C are, respectively, front perspective, rear perspective, front plan, and side views of the locking mechanism of the pannier.
Figure 8A:
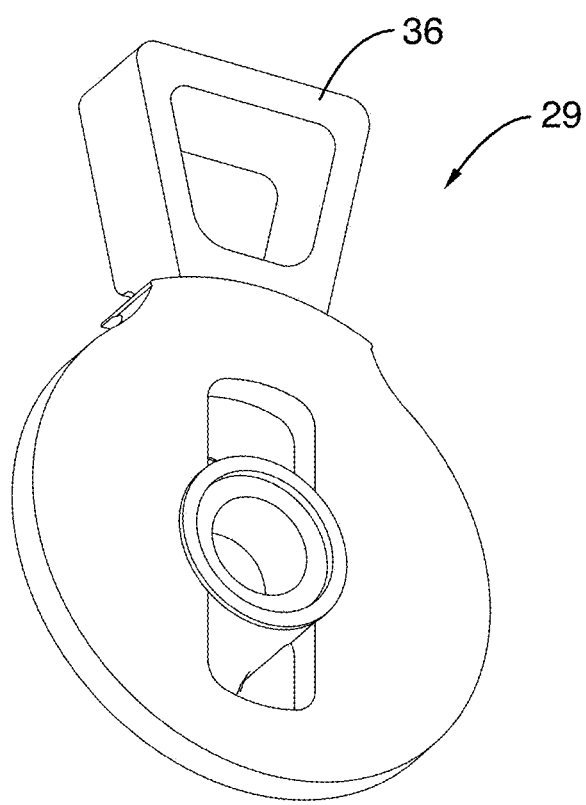
Figure 8B:
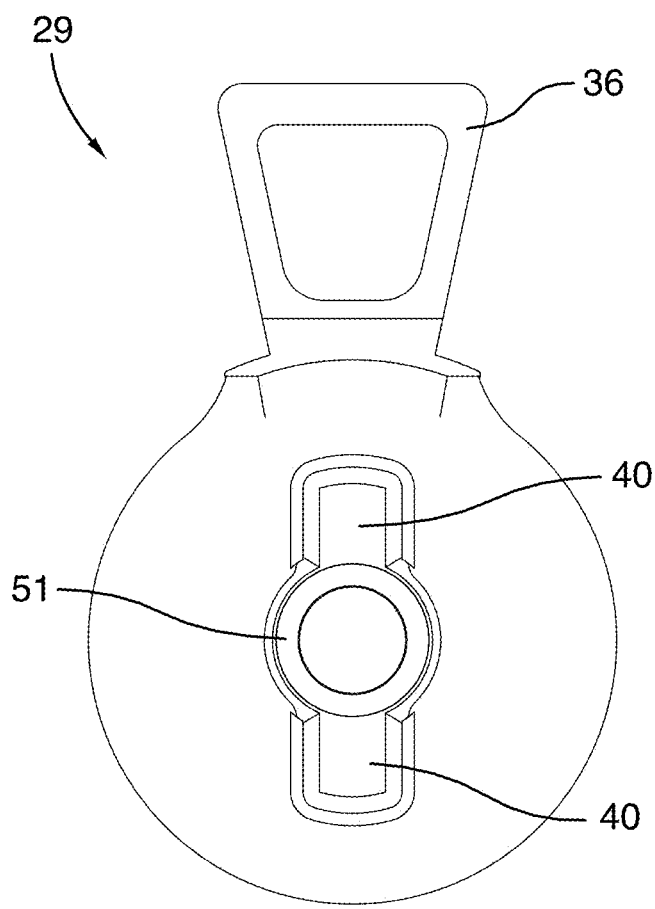

The wings 40 (FIG. 8) of locking mechanism 29 can be easily inserted into and removed from the keyed opening 28 when the locking mechanism 29 is in the position shown in FIG. 3. The keyed opening 28 is shaped to correspond to the profile of the locking mechanism 29 (FIG. 8), having a central portion with arcuate sides 50 (FIG. 10B) to accommodate central bore 51 of the locking mechanism, and upper and lower portions having generally straight, parallel sides 52 to accommodate wings 40.

Figure 8C:
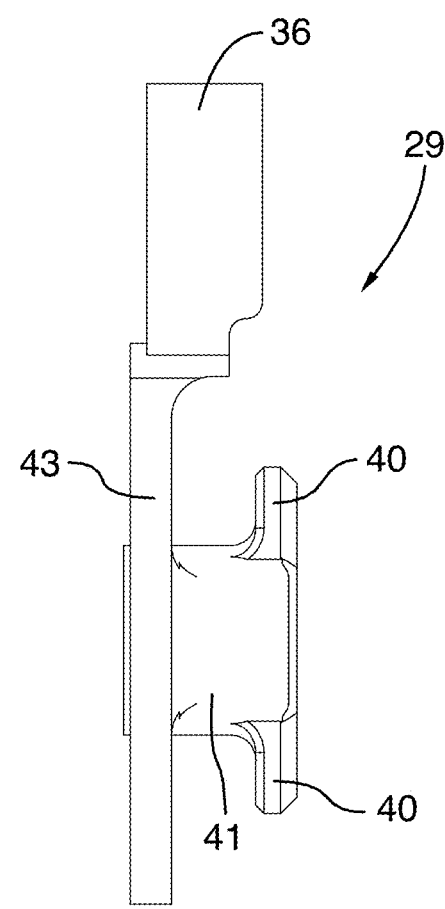
Figure 20:
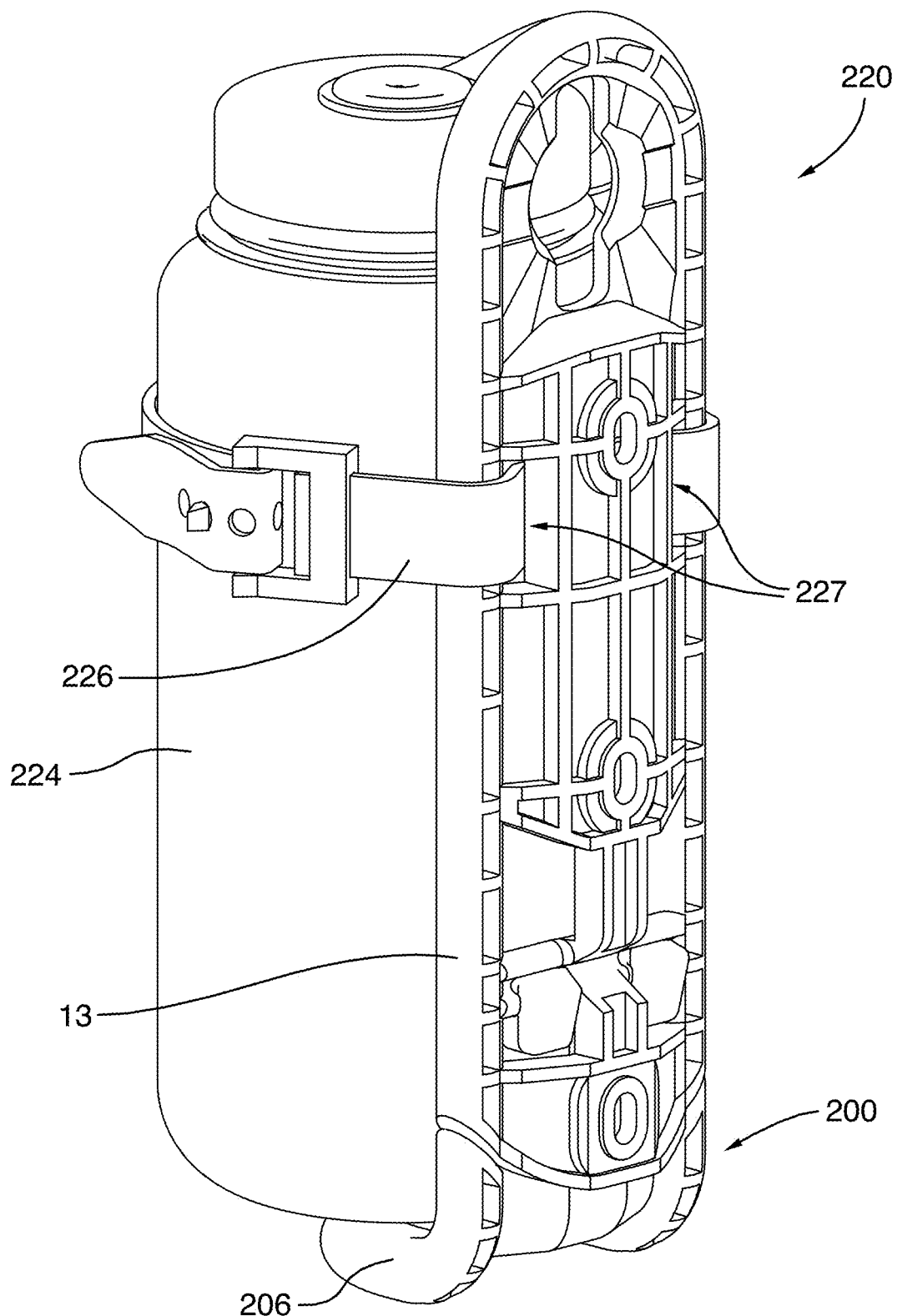
FIG. 20 is a rear perspective view showing a water bottle attached to the water bottle holder shown in FIGS. 19 and 19A.

The wings 40 are mounted on a shaft 41 (FIG. 8C) that extends a sufficient distance D from a base plate 43 of the locking mechanism to provide adequate clearance for the wall thickness of the upper body portion 46 of the rack. As discussed above, upper body portion 46 is recessed relative to the plane of the central rack body 15 in the area where the rack body is mounted to the fork. This allows clearance for the wings of the locking mechanism to be rotated without the wings coming in contact with the fork. Upper body portion 46 is also recessed on the opposite side, as shown in FIG. 10, to provide clearance behind the upper portion of a water bottle when the rack is used as a water bottle holder as shown in FIG. 20.

Figure 3A:
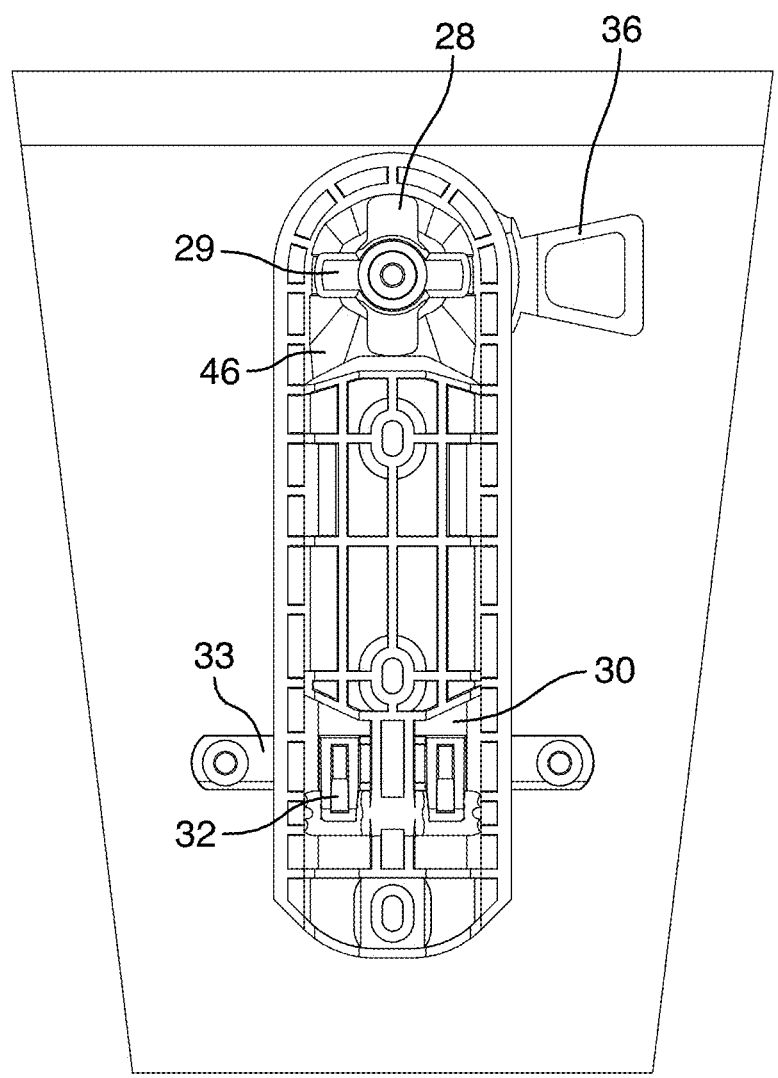
Figure 3B:
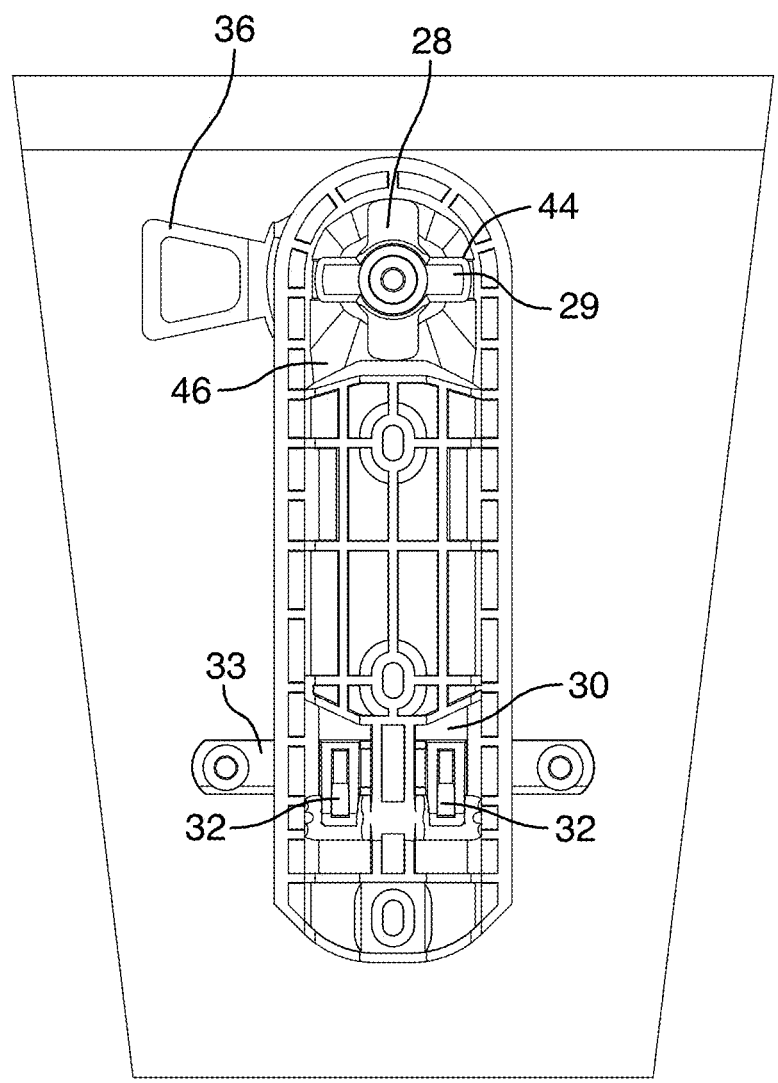

When the locking mechanism is rotated by the user to either of the locked positions shown in FIGS. 3A and 3B, the wings 40 ride up over a ramped surface 35 on the upper body portion 46 and across a circumferentially adjacent raised surface 53. The wings 40 then drop into a pair of transversely extending seats 44 that are recessed relative to the adjacent raised surfaces 53 (FIG. 10E) and are held in place by the seats. This engagement of the wings within the recessed seats helps prevent inadvertent rotation of the locking mechanism due to vibration or jolting during cycling. As shown in FIG. 10E, the ramped and raised surfaces are disposed on either side of each seat 44 around the circumference of the keyed opening, allowing the locking mechanism to be rotated in either direction and allowing both of the wings 40 to move up and over a raised surface and into a seat in the same manner.

Figure 6:
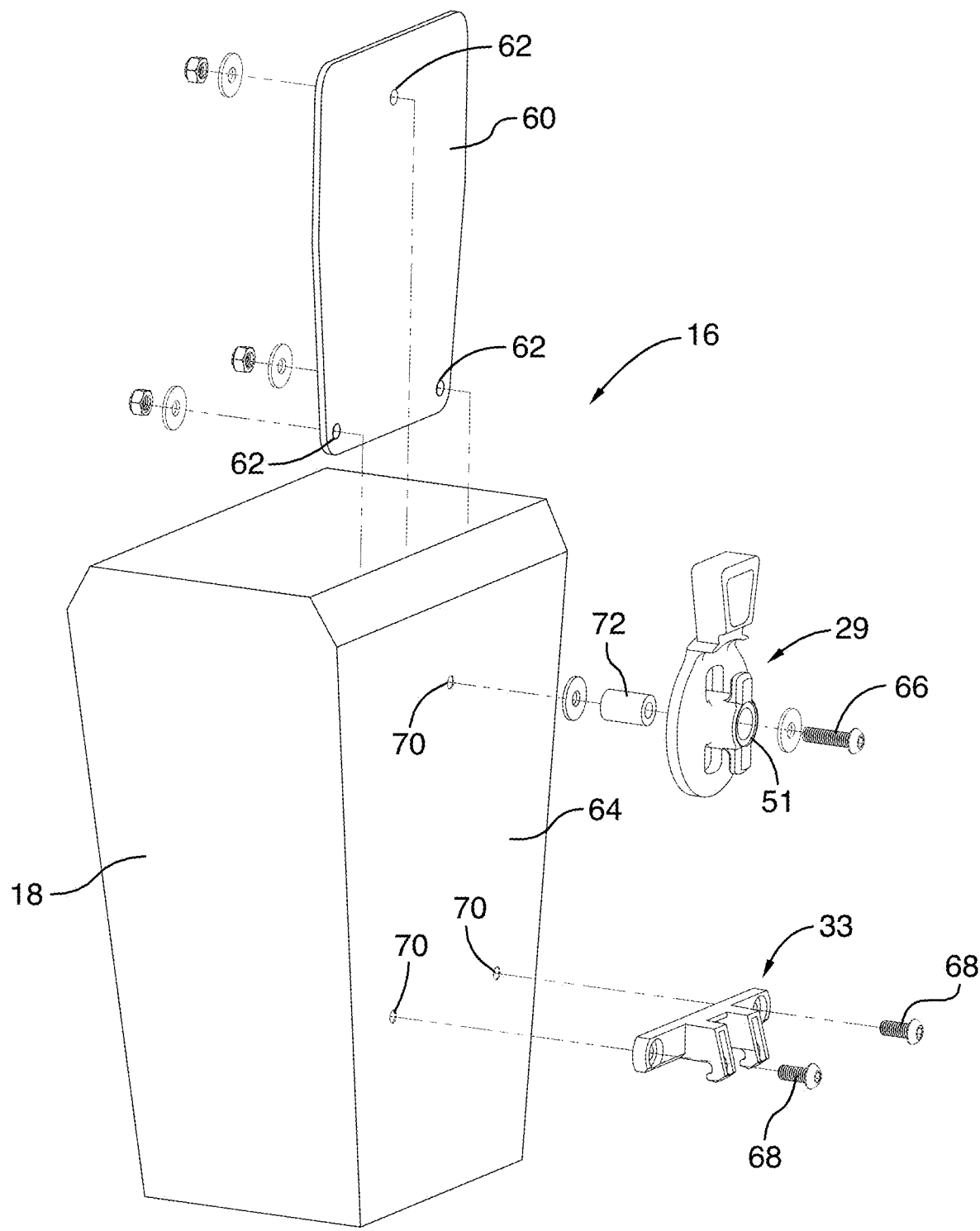
FIG. 6 is an exploded perspective view, showing the elements of the hardware of the pannier exploded from the bag portion of the pannier.

The manner in which the locking mechanism 29 and hook plate 33 are mounted on the bag 18 is shown in FIGS. 6 and 7. In the implementation shown, a plastic sheet 60, having apertures 62 (FIG. 6) is positioned against a back wall 64 of bag 16, on the inside of the bag. The locking mechanism 29 and hook plate 33 are then attached to the bag by fasteners 66 and 68, respectively, that extend through the apertures 62 and corresponding apertures 70 in the back wall 64.

To facilitate the pivoting movement of the locking mechanism 29, the fastener 66 extends through a sleeve 72 that is positioned in the central bore 51 of the locking mechanism 29.

Figure 9:
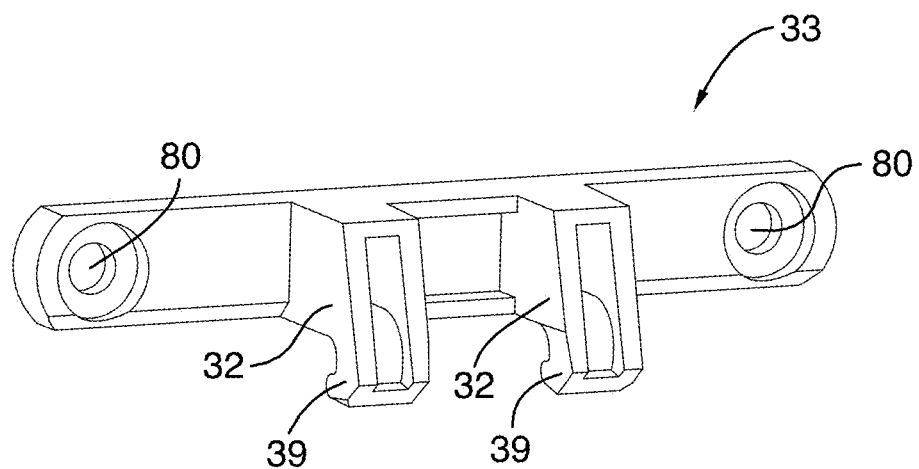
FIGS. 9 and 9A are, respectively, front perspective and rear perspective views of the hooking mechanism of the pannier.
Figure 9A:
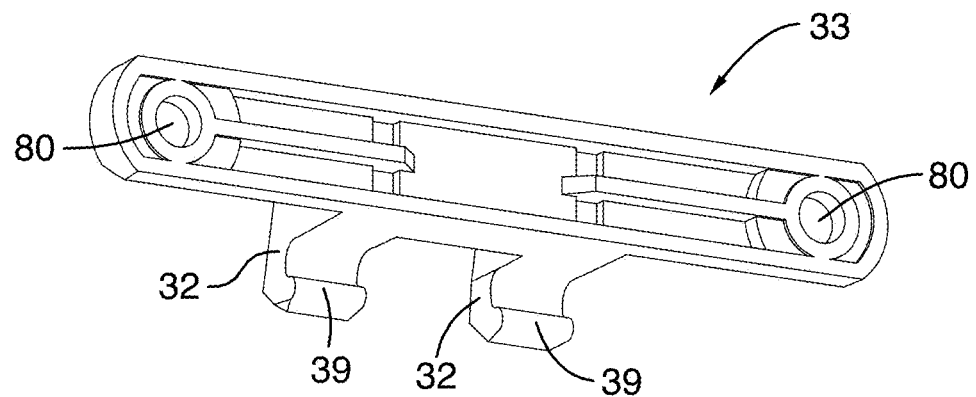

Fasteners 68 extend through countersunk apertures 80 (FIG. 9) in the hook plate 33. The fasteners 66 and 68 are held in place by engagement with corresponding fasteners (e.g., lock nuts, for example Nyloc nuts) 74, 76. Washers are provided as is conventional in the fastening art.

Figure 11:
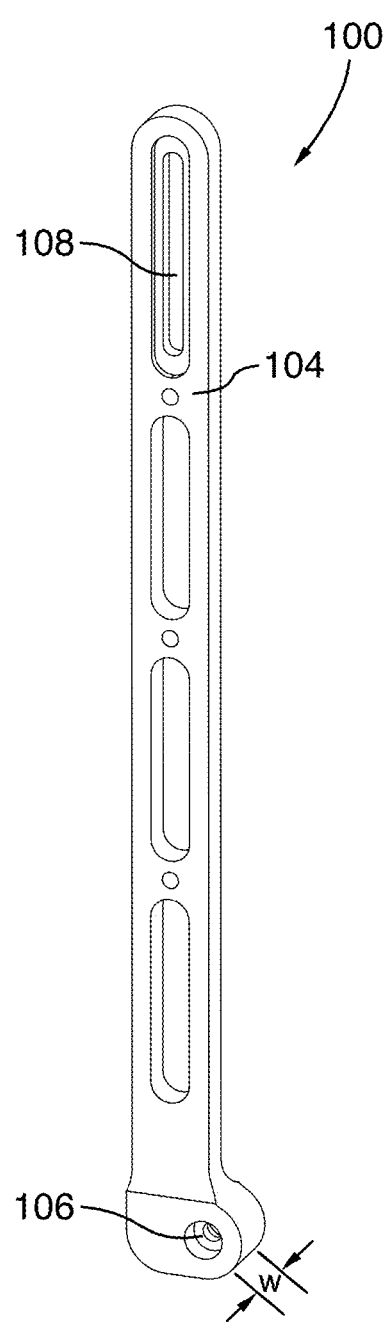
FIGS. 11 and 11A are, respectively, perspective and plan views of an axle-mounted fork adapter that may be used to mount the rack to the fork.
Figure 11A:
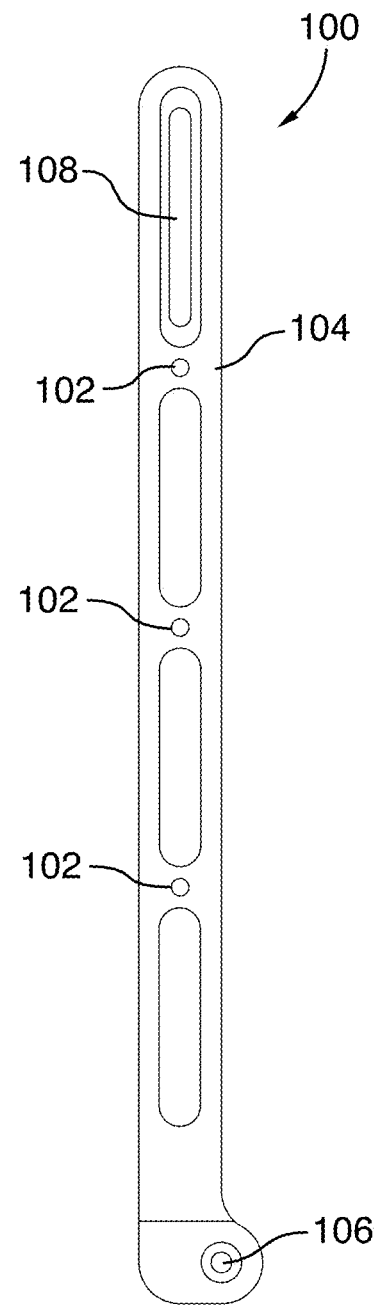
Figure 13:
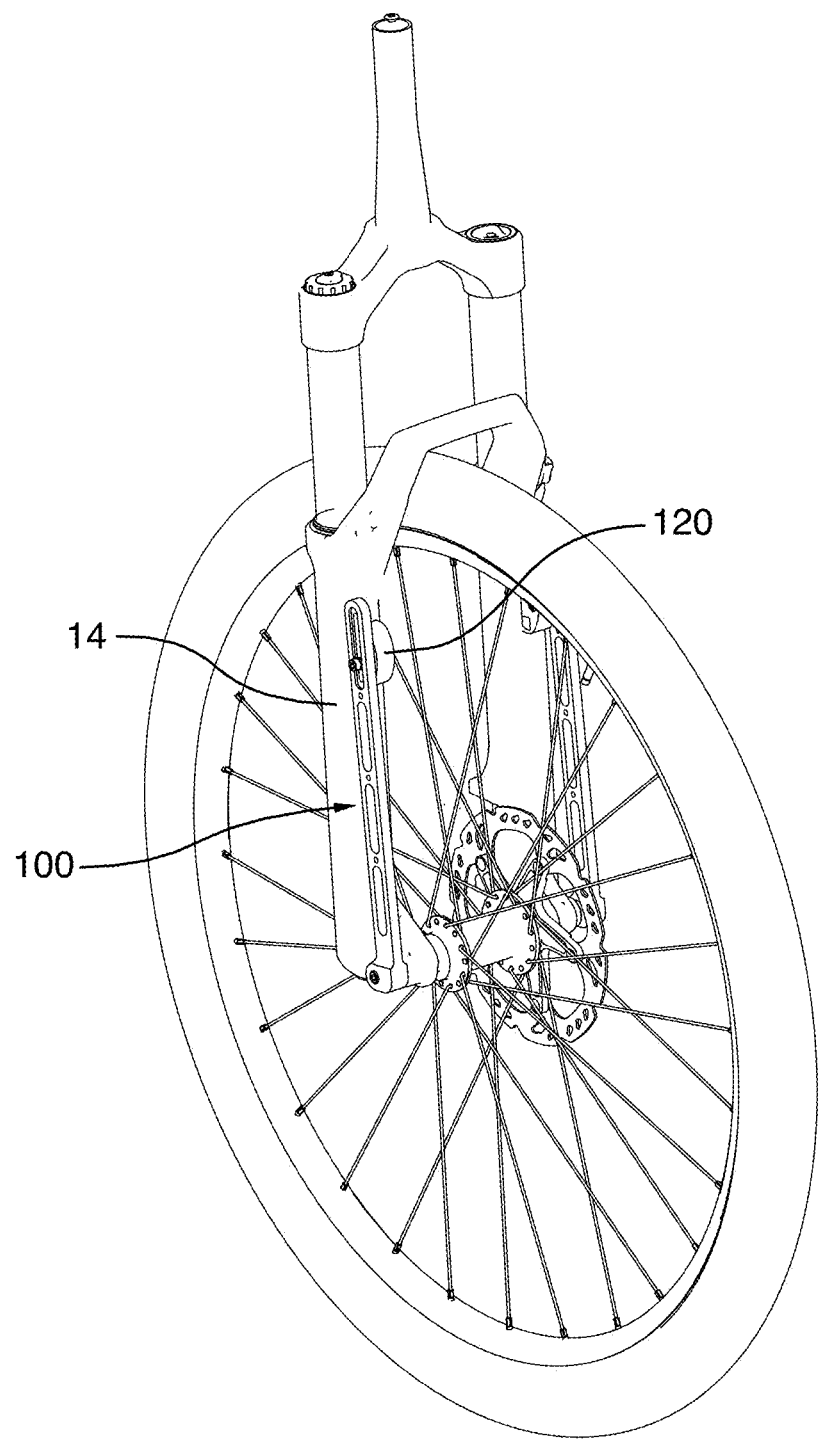
FIGS. 13 and 13A are, respectively, a front perspective and front plan view of the axle-mounted fork adapter and connector of FIGS. 11-12B mounted on a bicycle fork.
Figure 16:
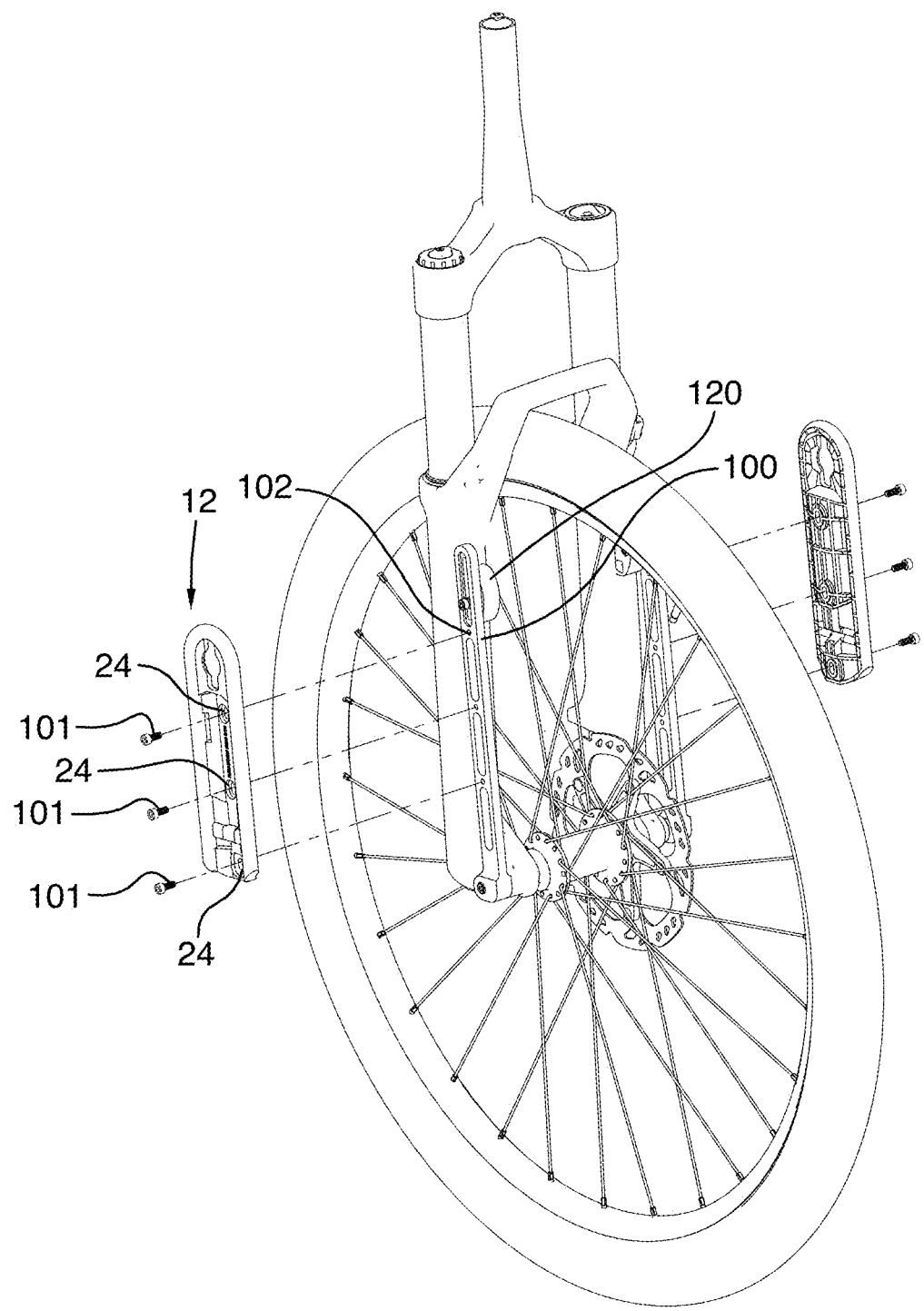
FIG. 16 is an exploded view of the components shown in FIGS. 15-15A.

Referring now to FIGS. 11-11A, if the rack is to be used on a fork that lacks bottle cage mounts an accessory 100 can be mounted adjacent the fork, as shown in FIG. 13, to provide suitable threaded mounting holes 102. Mounting holes 102 are spaced along the elongated body 104 of the accessory 100 to correspond to the spacing of apertures 24 on the rack 12 and receive fasteners 101 inserted through the apertures 24 as shown in FIG. 16. The accessory 100 can also be used with forks that do have bottle cage mounts to provide a more robust mounting of the rack than would be provided by the bottle cage mounts which may only be rated for a relatively light load (e.g., 2 kg or less) due to their intended use (supporting a water bottle cage and typical 16-18 oz water bottle). Accessory 100 is also useful if the fork includes bottle cage mounts that are positioned towards the front-facing or rear-facing surface of the fork (e.g., 30 to 45 degrees off center on the fork), as this positioning of the mounts is generally not feasible for mounting the rack and pannier system described herein.

Figure 14:
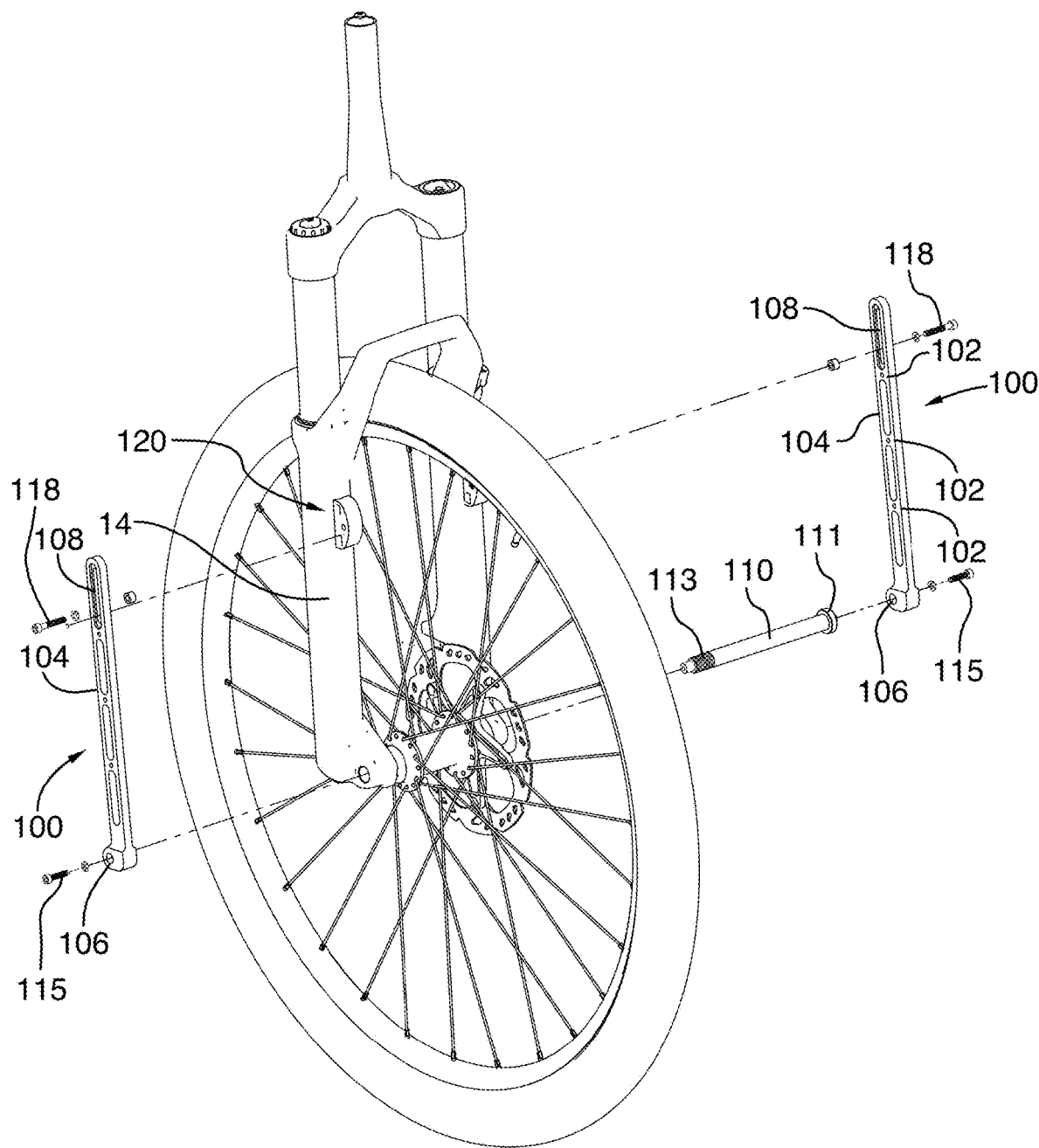
FIG. 14 is an exploded perspective view of the components shown in FIGS. 12 and 12A.

The body 104 of accessory 100 also defines an axle-receiving aperture 106, configured to receive an end of a thru axle 110 of the bicycle, as shown in FIG. 14. The thru axle 110 is preferably a thru axle commercially available from Robert Axle Project, which, as shown in FIG. 14, includes a first end 111 that extends from one side of the hub and a second end 113 that extends from the other end of the hub. Both ends 111 and 113 include a threaded inner bore that is configured to receive a fastener 115 (e.g., a bolt with 5 mm threads) in threaded engagement. The apertures 106 of the body 104 are configured to receive the ends 111 and 113, i.e., the inner diameter of the apertures 106 is selected to fit over the outer diameter of ends 111 and 113 with very little clearance. The fasteners 115 are then threaded into the inner bore of the ends to hold the accessories securely in place on the axle and thus on the fork. The wall thickness W (FIG. 11) of the accessory 100 in the area of aperture 106 is at least 6 mm, and preferably from about 12 to 24 mm, to accommodate the length of the ends 111 and 113 of the thru axle 110 that protrude beyond the hub, providing a very secure and strong connection of the accessory 100 to the fork.

The aperture 106 is offset from the longitudinal centerline of the accessory 100, e.g., by about 12 to 25 mm. This offset allows the accessory 100 to be positioned slightly forward of the fork, as shown in FIG. 13. This positioning allows the accessory 100 to be used on forks that include bottle cage mounts, as discussed above. If the bottle cage mounts are provided on the side-facing surface of the fork, the positioning of the accessory prevents the bottle cage mounts from displacing the accessory outwardly from the fork, whereas if the bottle cage mounts are provided on the front-facing or rear-facing surface of the fork the position of the accessory allows the front-facing or rear-facing bottle mounts to be used for mounting a bottle cage.

An oblong aperture 108 extends through the upper end of the accessory 100 and is configured to facilitate attachment of the upper end of the accessory 100 to the fork by threading a fastener 118 into a connector 120 (FIG. 14) and anchoring it, e.g., with a lock nut (not shown), e.g., a Nyloc nut.

Figure 12:
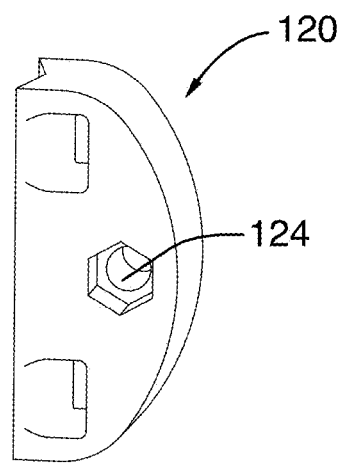
FIGS. 12-12B are, respectively, front perspective (facing away from the bicycle), rear perspective (facing towards the bicycle), and front plan views of a connector used to secure the upper end of the axle-mounted fork adapter shown in FIGS. 11-11A to the fork.
Figure 12A:
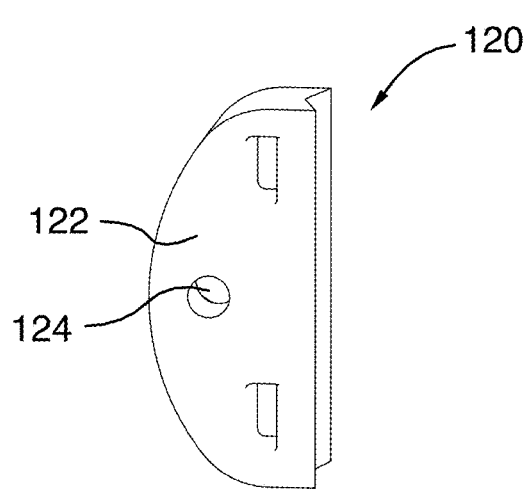
Figure 12B:
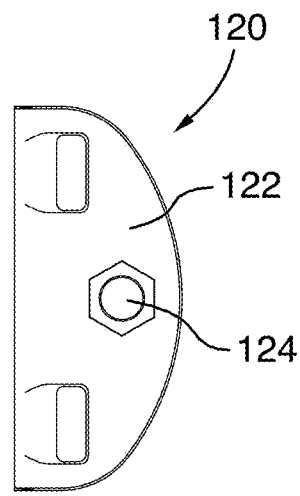

The connector 120 is shown in isolation in FIGS. 12-12B. Connector 120 includes a body 122 having an aperture 124 configured to receive fastener 118 (FIG. 14) and two apertures 126 configured to receive heavy duty cable ties ("zip ties") (not shown) to fasten the connector to the fork 14. In the implementation shown, the body 122 includes a longitudinally extending surface having a generally V-shaped cross-section to help the body 122 mate with the curved surface of the fork.

The mounting of accessory 100 using the thru axle 110 and connector 120 allows the accessory to be easily removed by a user if the user wishes to reconfigure the cargo carrying system of their bicycle to include, for example, an over-the-wheel axle-mounted front rack such as the cargo racks commercially available from Old Man Mountain Co. Mounting the accessory 100 using the thru axle 110 also attaches the accessory in a manner that eliminates the risk of the accessory slipping down, which can occur with accessories that are strapped to a fork, especially if the fork has a taper. Additionally, mounting the accessory 100 using the thru axle 110 prevents the accessory from rotating relative to the fork 14, thus avoiding the risk of items mounted on the accessory 100 getting caught in the spokes during cycling.

Figure 13A:
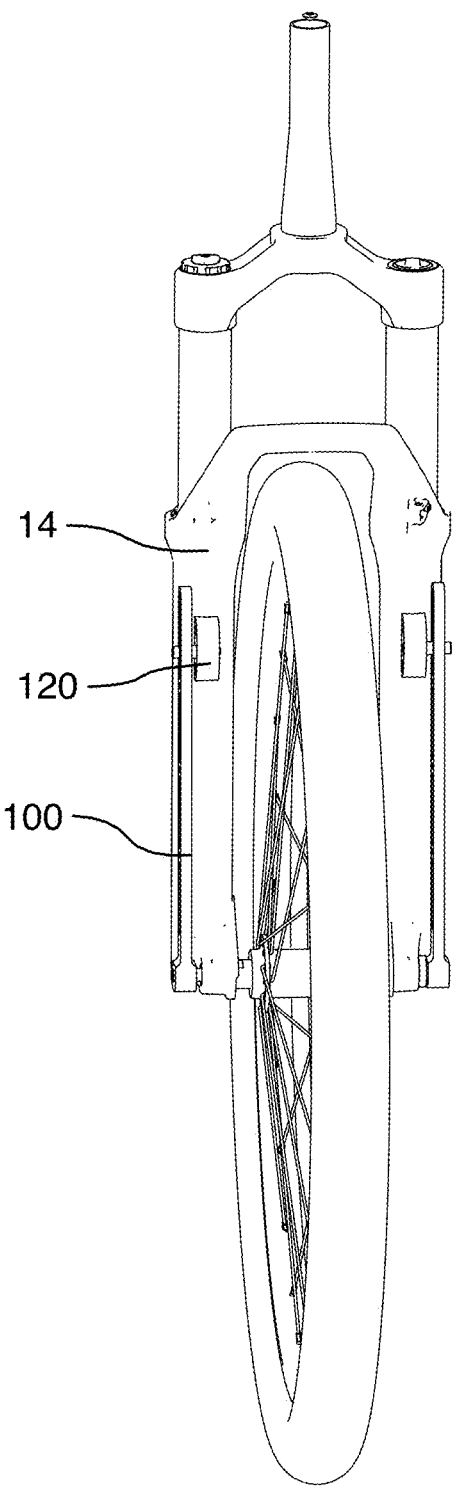
Figure 13B:
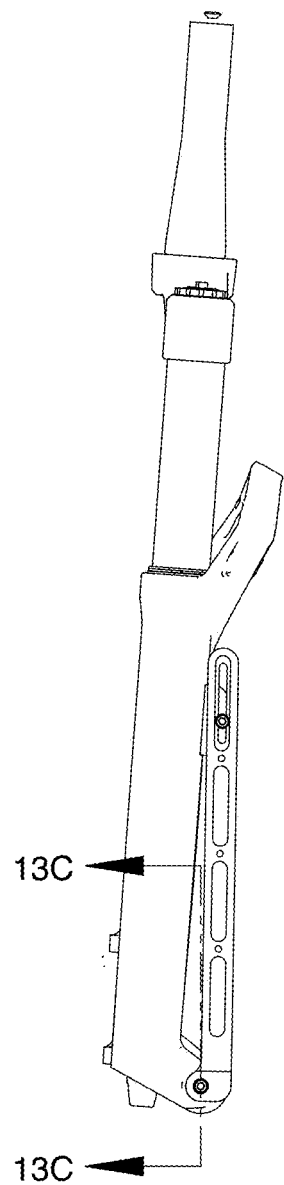
FIG. 13B is a side view of the axle-mounted fork adapter and connector.
Figure 13C:
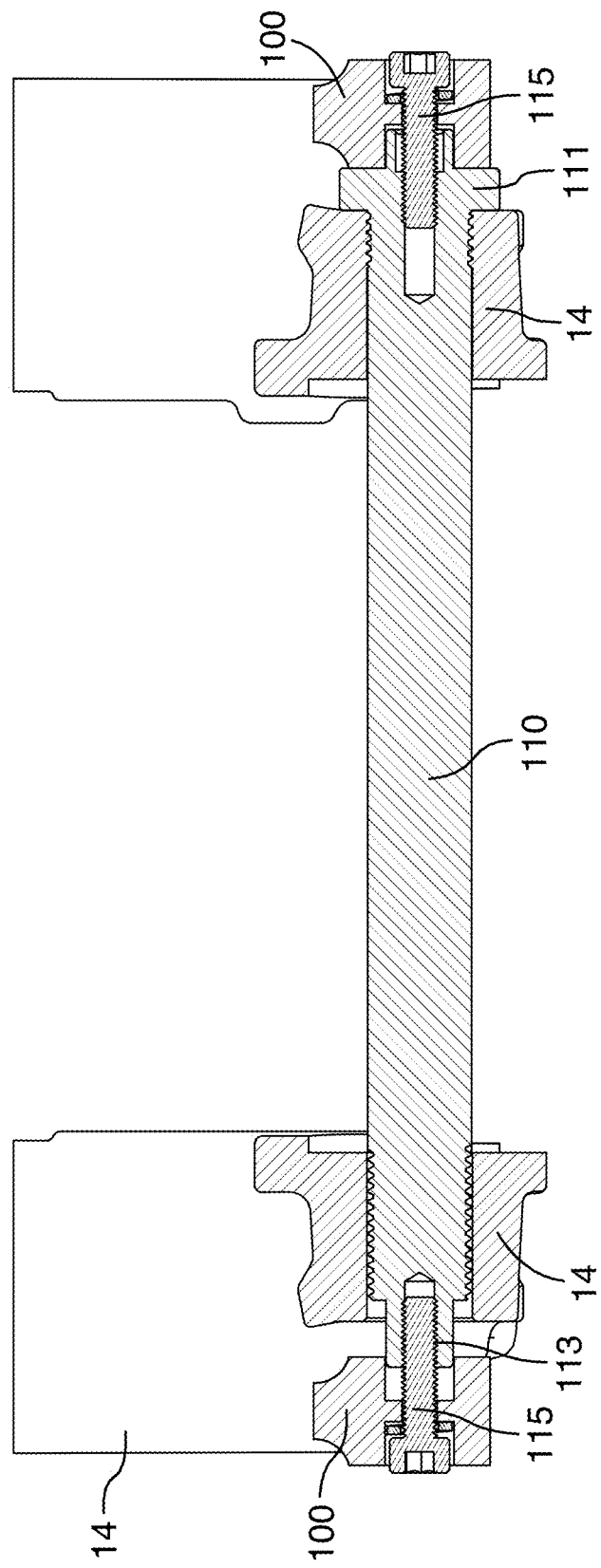
FIG. 13C is a cross-sectional view taken along line C-C in FIG. 13B.
Figure 15:
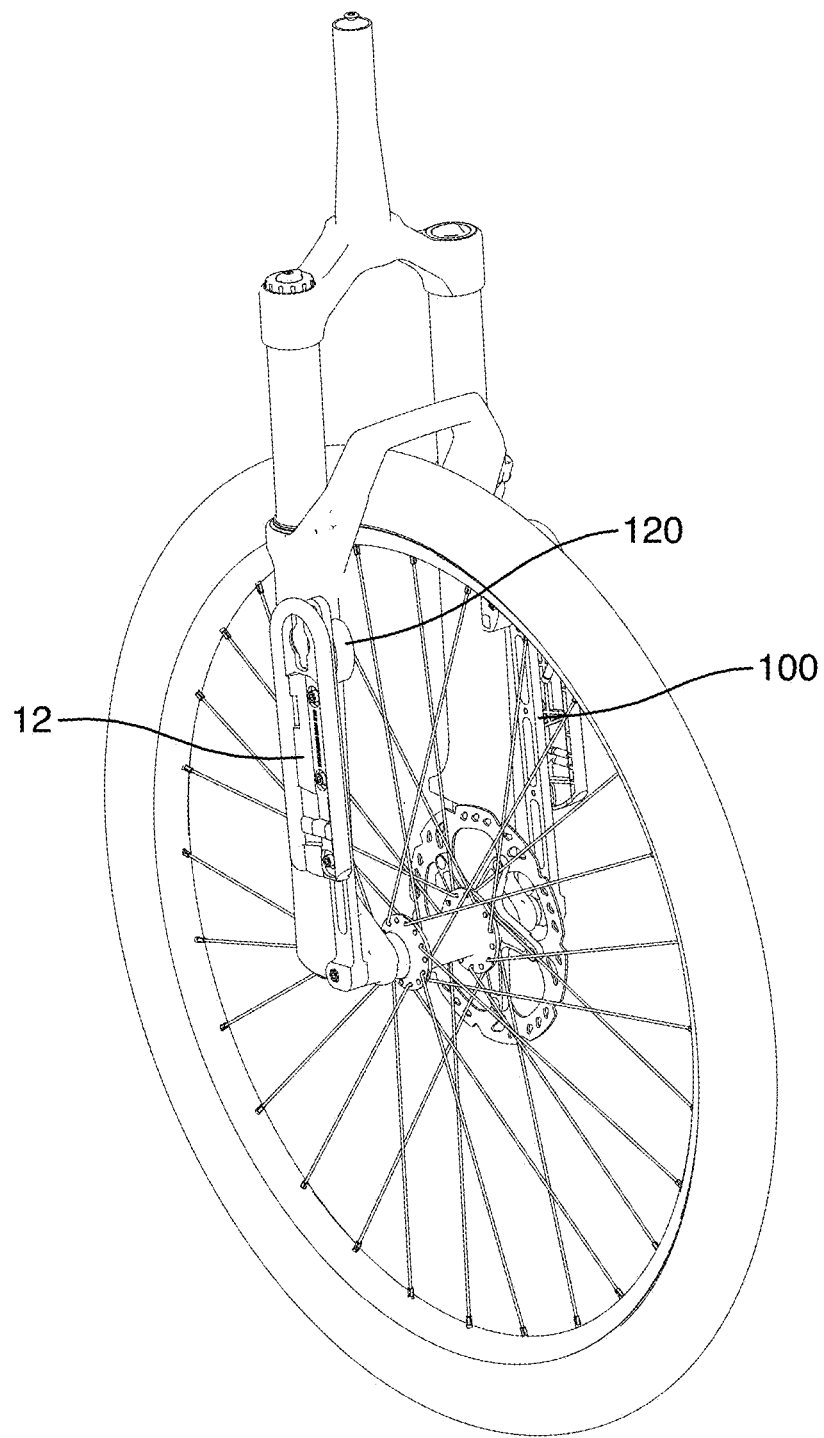
FIGS. 15-15A are, respectively, a front perspective and front plan view of the rack shown in FIG. 1 mounted on the fork via the axle-mounted fork adapter.
Figure 15A:
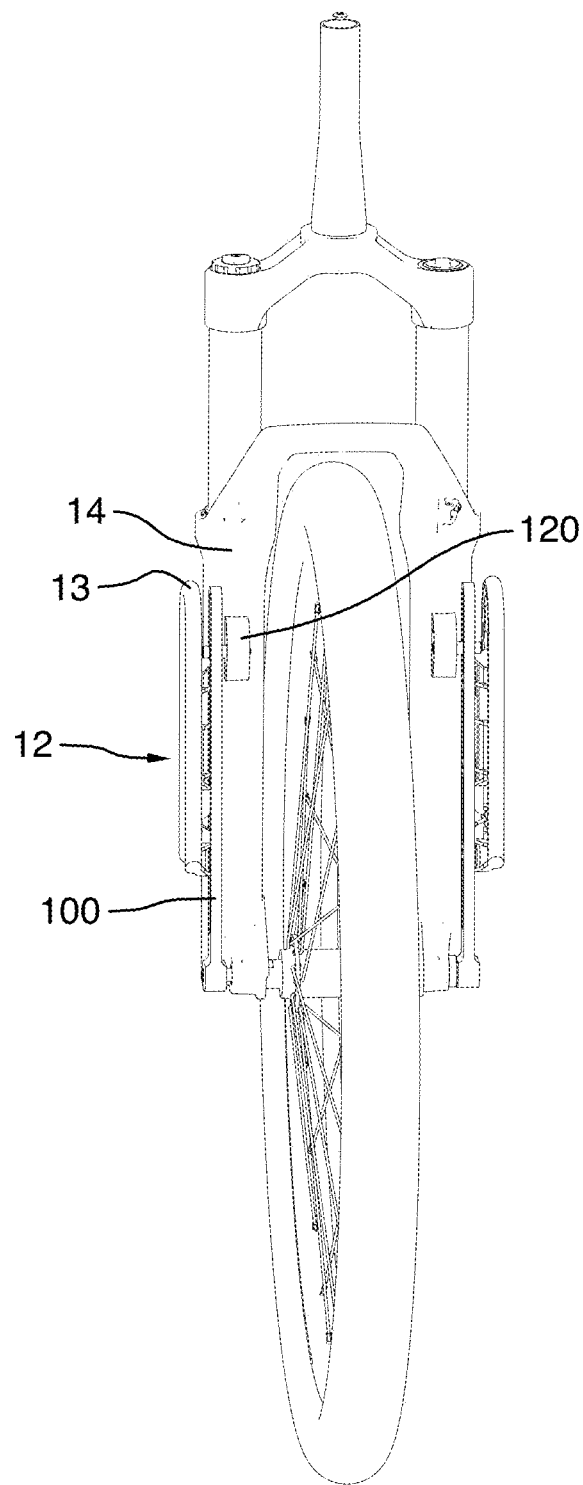
Figure 17:
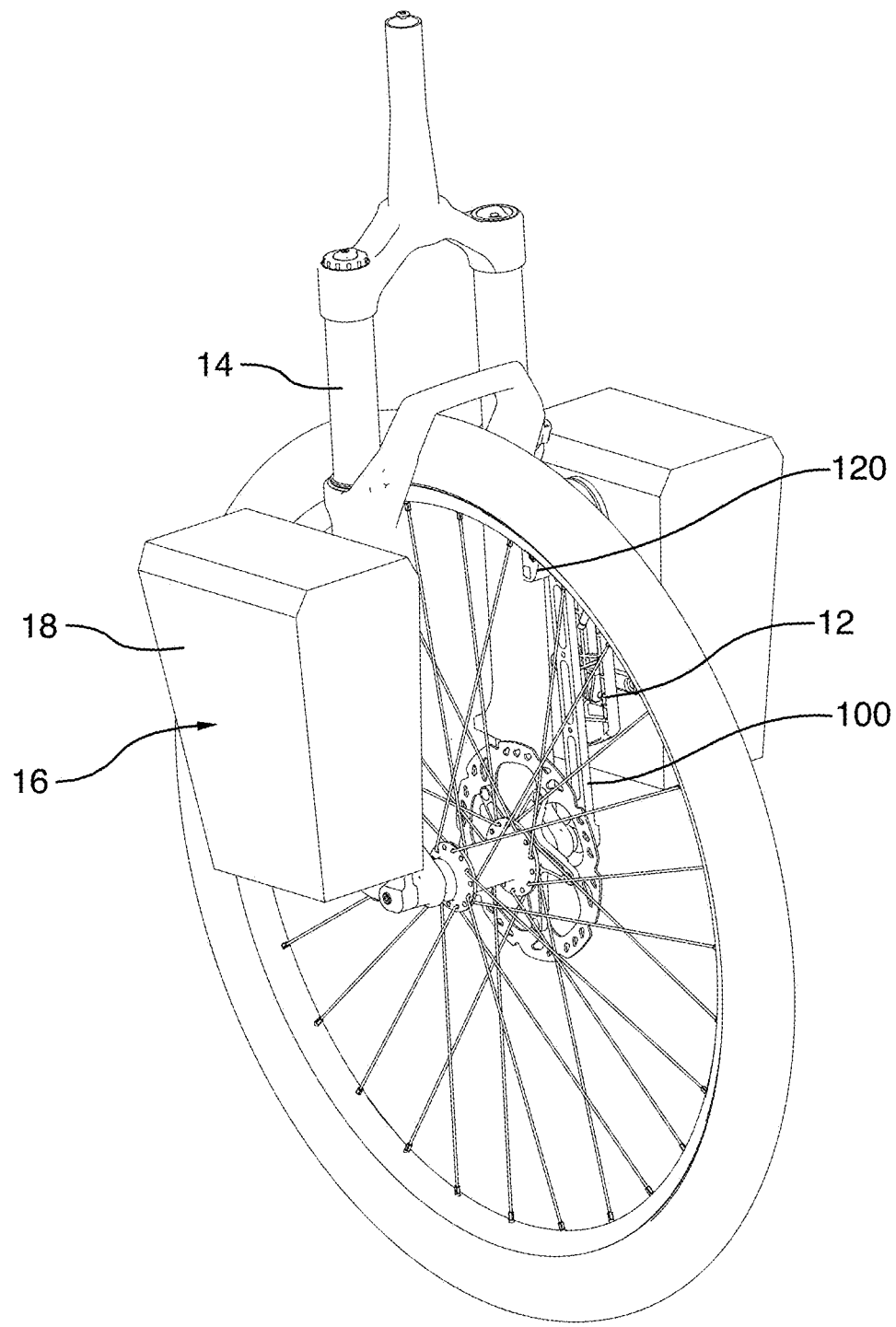
FIG. 17 is a perspective view of a complete bicycle rack and pannier system mounted on a fork using axle-mounted fork adapters.

The accessory 100 and connector 120 are shown mounted on a fork in FIGS. 13-13A. A rack 12 mounted on the accessory 100 is shown in FIGS. 15-15A. A complete system is shown in FIG. 17, including an assembly of accessory, connector, rack, and pannier on each side of the fork.

Figure 18A:
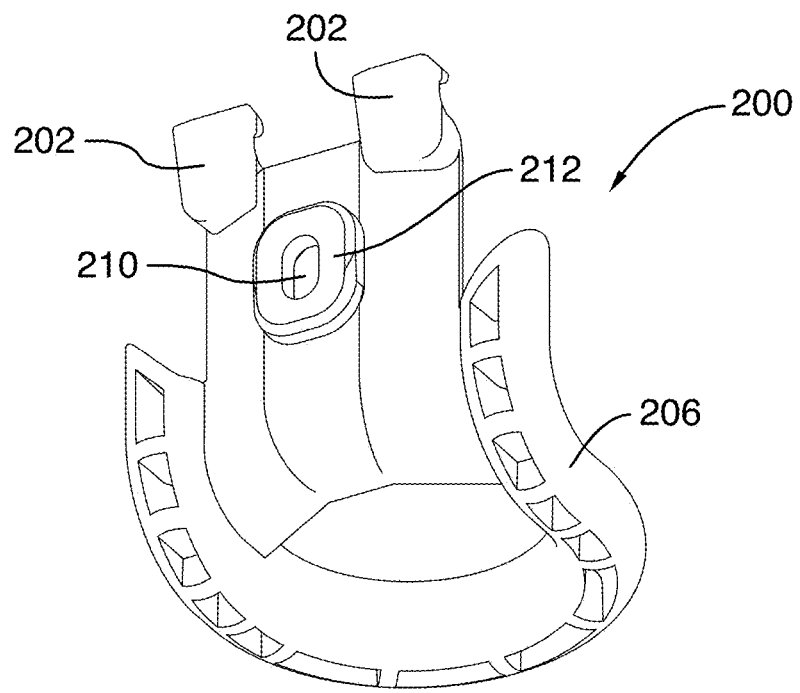
Figure 19:
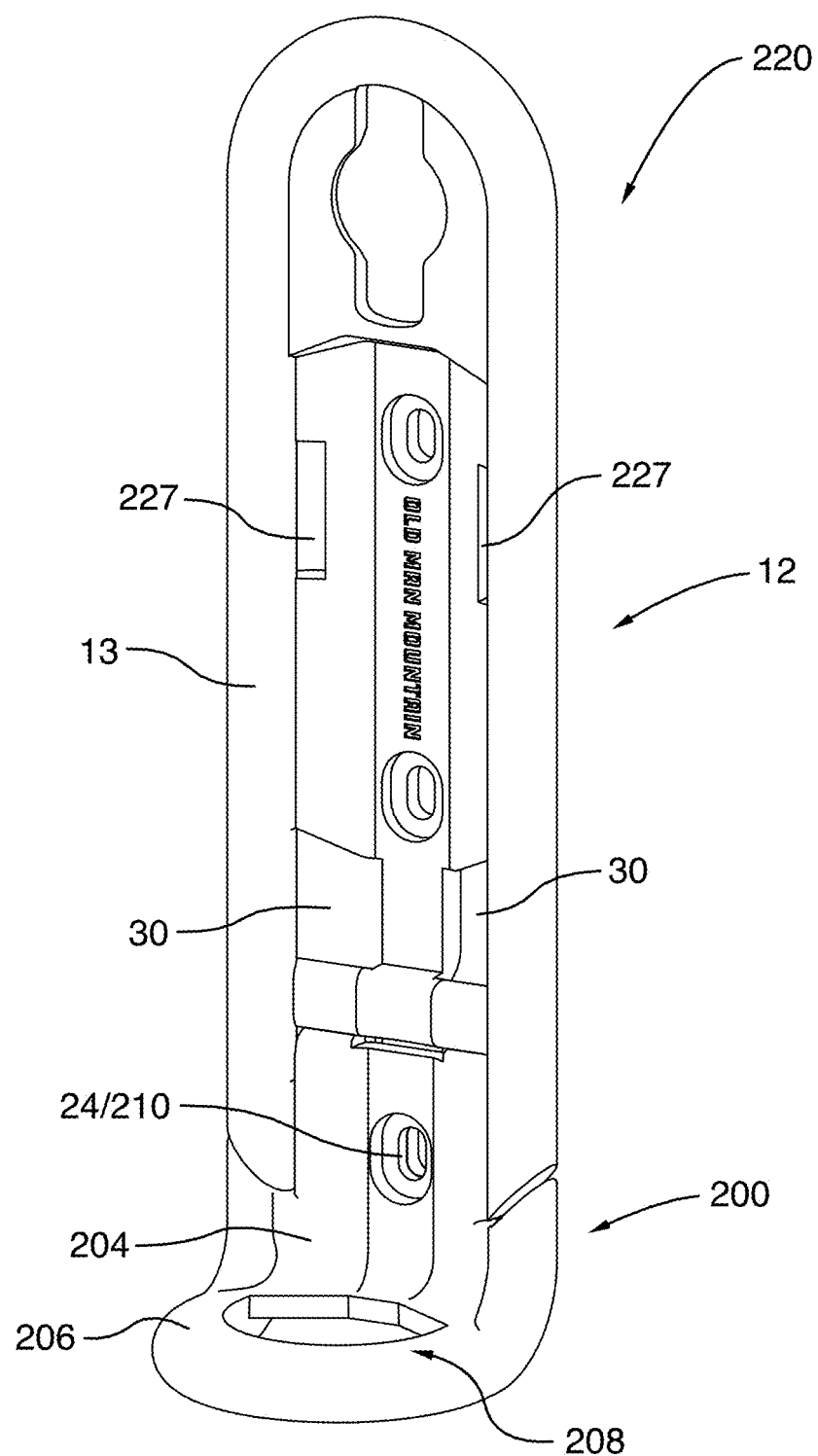
FIGS. 19 and 19A are, respectively, front and rear perspective views of the rack shown in FIGS. 10 and 10A with the foot shown in FIGS. 18 and 18A attached thereto to form a water bottle holder.
Figure 19A:
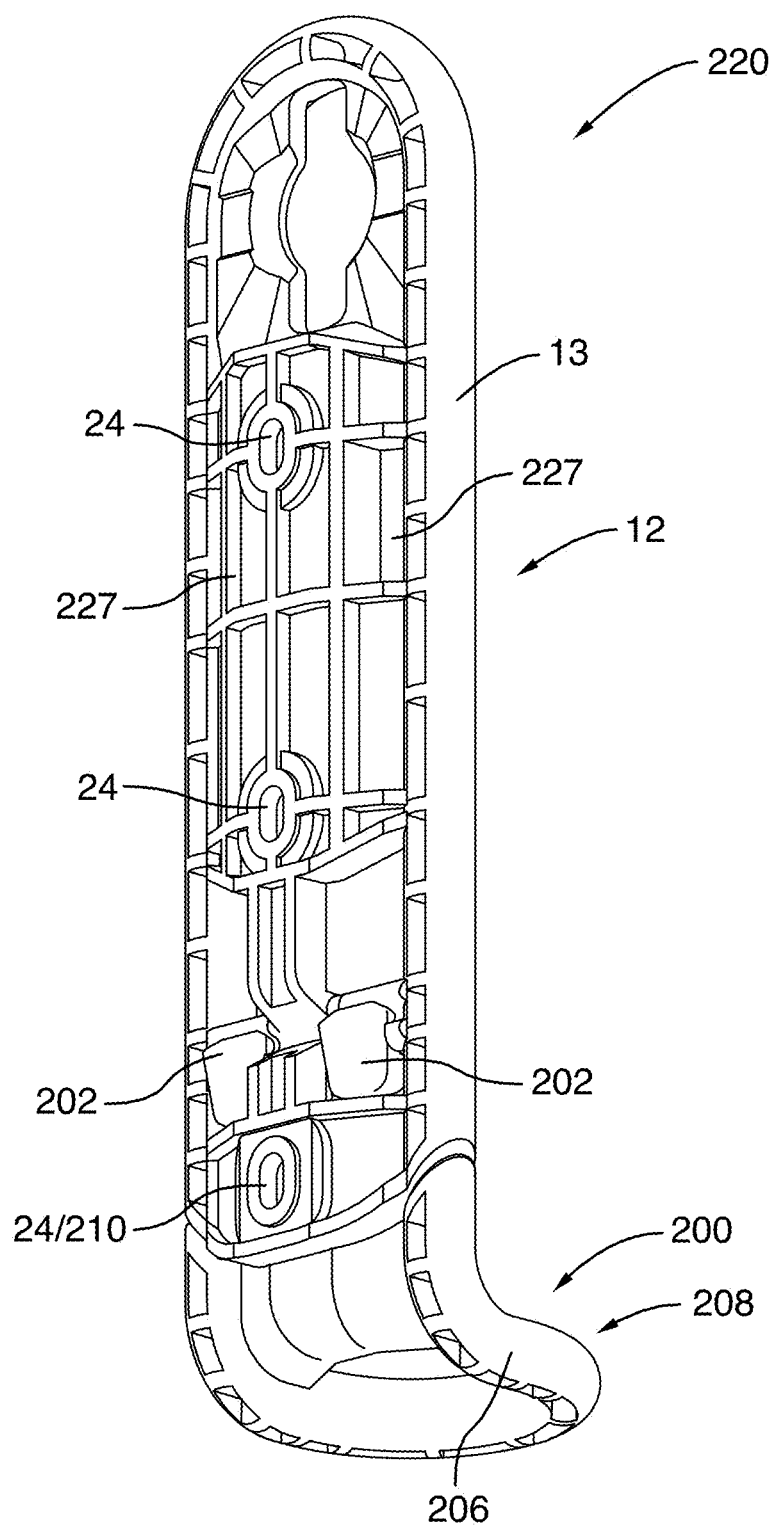

The rack 12 can also be used to mount other accessories when not being used to carry a pannier. For example, a foot 200, shown in FIGS. 18-18A, can be attached to the rack 12 as shown in FIGS. 19-19A, forming an open water bottle carrier 220. The water bottle carrier 220 is shown in use, holding a bottle 224 secured by a strap 226, in FIG. 20. The strap 226 is held in place vertically on the bottle 224 by threading the strap through slots 227 (FIG. 19) on the rack.

The foot 200 includes a pair of hooks 202 that are configured to be inserted into openings 30 in the rack from the back side of the rack as can be seen in FIG. 19A. The hooks 202 extend from a body 204 that includes a rim portion 206 that is configured to smoothly extend from the frame 13 of the rack and to provide a horizontally extending shelf surface 208 configured to support a bottle, e.g., bottle 224 shown in FIG. 20. The body 204 also defines an aperture 210 and a surrounding boss 212 that are configured to engage the bottom aperture 24 of the rack 12.

Other Embodiments

A number of embodiments have been described. Nevertheless, it will be understood that various modifications may be made without departing from the spirit and scope of the disclosure.

For example, in some implementations the plastic sheet 60 shown in FIGS. 6 and 7 and described above could be omitted, for example if the bag 18 or the back wall thereof were made of a sufficiently rigid material to support the locking mechanism 29 and hook plate 33.

As another example, while the use of the connector 120 is preferred, the upper end of the accessory 100 can be attached to the fork in a different matter, e.g., by directly clamping the upper end to the fork through the aperture 108 or by attaching the upper end to an eyelet on the frame if one is provided. Similarly, while attachment of the aperture 106 to a thru axle is preferred due to the strength and security provided, as described above, the lower end of the accessory could be attached in a different manner, e.g., by clamping to a quick release skewer or bolting directly to the fork using eyelets near the axle.

Moreover, while it is generally preferred that the hooks be provided on the pannier and the bar that is engaged by the hooks be provided on the rack, as described above and shown in the drawings, alternatively the hooks can be provided on the rack and a bar provided on the pannier. The lower portion of the pannier can also be removably secured in other manners, not requiring a bar and hooks, if desired.

Additionally, while mounting the rack to the front fork or an accessory attached to the front fork has been described above, the rack can also be mounted on other areas of the bicycle, for example on a different style of rack that includes water bottle mounts, such as the Elkhorn Rack available from Old Man Mountain.

Accordingly, other embodiments are within the scope of the following claims.

What is claimed is:

1. A bicycle rack and pannier system, the system comprising:
   a pannier comprising a bag having a back wall, and a locking mechanism, and
   a rack configured to be mounted generally vertically on a portion of a bicycle, the rack including a rack body having a keyed opening configured to receive a portion of the locking mechanism;
   wherein the locking mechanism is mounted on the bag to be pivotable between an open position, in which the portion can be inserted into or removed from the keyed opening, and at least one locked position, in which the portion abuts a surface of the rack body preventing removal of the portion of the locking mechanism.

2. The system of claim 1 wherein the locking mechanism includes a base plate, a shaft extending from the base plate and defining a central bore, and a pair of wings extending radially from the central bore, and the keyed opening is shaped to correspond to the profile of the shaft and wings.

3. The system of claim 2 wherein a sleeve is positioned in the central bore of the locking mechanism and the sleeve is secured to the back wall of the bag, such that the sleeve is stationary and the locking mechanism rotates relative to the sleeve.

4. The system of claim 2 wherein a rear-facing surface of the rack body includes a seat configured to receive the wings when the locking mechanism is pivoted into (one of) the locked position(s).

5. The system of claim 1 wherein the pannier further comprises one or more hooks extending from the back wall, and the rack further comprises one or more openings configured to receive the one or more hooks.

6. The system of claim 1 wherein the rack body is configured to be mounted on the fork of the bicycle.

7. The system of claim 6 wherein the rack body includes apertures positioned to correspond to a spacing of bottle cage mounts on the fork.

8. The system of claim 7 further comprising an accessory configured to be mounted adjacent the fork, the accessory having mounting points configured to receive fasteners inserted through apertures in the rack body.

9. The system of claim 8 wherein the accessory comprises an elongated body including threaded apertures positioned to correspond to the spacing of the apertures in the rack body.

10. The system of claim 9 wherein the accessory further comprises an aperture configured to allow a lower end of the accessory to be mounted on an end of a thru axle.

11. The system of claim 1 wherein the locking mechanism is configured to be pivoted into two discrete locked positions.

12. The system of claim 11 wherein the locked positions are disposed at 180 degrees to each other.

13. The system of claim 1 wherein the locking mechanism does not include a spring mechanism.

14. A method of mounting a pannier on a fork of a bicycle, the method comprising:
providing a bicycle rack and pannier system, the system comprising:
a pannier comprising a bag having a back wall, and a locking mechanism extending from the back wall, and
a rack configured to be mounted generally vertically on the fork, the rack including a rack body having a keyed opening configured to receive a portion of the locking mechanism;
inserting the portion of the locking mechanism through the keyed opening with the portion aligned with the keyed opening; and
rotating the portion of the locking mechanism to a locked position in which the portion is out of alignment with the keyed opening.

* * * * *